(12) United States Patent
Ishizuka et al.

(10) Patent No.: US 7,641,999 B2
(45) Date of Patent: Jan. 5, 2010

(54) FUEL CELL STACK

(75) Inventors: Ayumu Ishizuka, Utsunomiya (JP);
Hideaki Kikuchi, Kawachi-gun (JP); Go Morimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 277 days.

(21) Appl. No.: 11/212,285

(22) Filed: Aug. 26, 2005

(65) Prior Publication Data

US 2006/0046127 A1    Mar. 2, 2006

(30) Foreign Application Priority Data

Aug. 27, 2004 (JP) .............................. 2004-248133
Aug. 31, 2004 (JP) .............................. 2004-252135
Sep. 6, 2004 (JP) .............................. 2004-258264

(51) Int. Cl.
*H01M 8/00* (2006.01)
*H01M 2/00* (2006.01)
*H01M 2/02* (2006.01)
*H01M 2/14* (2006.01)

(52) U.S. Cl. .............................. 429/34; 429/38; 429/12

(58) Field of Classification Search .................. 429/34, 429/38
See application file for complete search history.

(56) References Cited

U.S. PATENT DOCUMENTS

| 5,384,212 | A  | * | 1/1995 | Heiman et al. ............... 429/143 |
| 6,183,903 | B1 | * | 2/2001 | Campbell et al. ........... 429/176 |
| 6,703,153 | B1 | * | 3/2004 | Cubukcu et al. .............. 429/30 |
| 6,855,448 | B2 |   | 2/2005 | Kikuchi et al. |
| 2002/0142209 | A1 | * | 10/2002 | Kikuchi et al. ................. 429/34 |

FOREIGN PATENT DOCUMENTS

| JP | 52-133737   | 10/1977 |
| JP | 53-66436    | 6/1978  |
| JP | 56-81821    | 7/1981  |
| JP | 58-125490   | 7/1983  |
| JP | 59-118723   | 8/1984  |
| JP | 99-118723   | 8/1984  |
| JP | 7-172434    | 7/1995  |
| JP | 8-26269     | 1/1996  |
| JP | 2001-130565 | 5/2001  |
| JP | 2001-135344 | 5/2001  |

(Continued)

OTHER PUBLICATIONS

Japanese Office Action for Application No. 2004-248133, dated Jun. 2, 2009.

(Continued)

*Primary Examiner*—Dah-Wei D Yuan
*Assistant Examiner*—Steven Scully
(74) *Attorney, Agent, or Firm*—Lahive & Cockfield, LLP; Anthony A. Laurentano, Esq.

(57) ABSTRACT

A fuel cell stack includes side plates of a casing. Flanges are provided on the side plates on the short sides for coupling the side plates on the short sides to the other side plates on the long sides. In each of the side plates, the center O of the coupling pin is offset from the neutral surface NS of the side plate in a direction away from a stack body by the distance "h".

16 Claims, 34 Drawing Sheets

FOREIGN PATENT DOCUMENTS

| | | |
|---|---|---|
| JP | 2002-298901 | 10/2002 |
| JP | 2006-73226 | 3/2006 |

OTHER PUBLICATIONS

Japanese Office Action for Application No. 2004-252135, dated Jun. 2, 2009.

Japanese Office Action for Application No. 2004-258264, dated May 26, 2009.

Japanese Office Action for Application No. 2004-248133, dated Aug. 25, 2009.

\* cited by examiner

FUEL CELL STACK

BACKGROUND OF THE INVENTION

1. Field of the Invention:

The present invention relates to a fuel cell stack including a box-shaped casing and a stack body provided in the casing. The stack body is formed by stacking a plurality of unit cells. Each of the unit cells includes an electrolyte electrode assembly and separators sandwiching the electrolyte electrode assembly. The electrolyte electrode assembly includes a pair of electrodes, and an electrolyte interposed between the electrodes.

2. Description of the Related Art:

For example, a solid polymer fuel cell employs a membrane electrode assembly which includes an anode and a cathode, and an electrolyte membrane (electrolyte) interposed between the anode and the cathode. The electrolyte membrane is a polymer ion exchange membrane. The membrane electrode assembly and separators sandwiching the membrane electrode assembly make up a unit of a fuel cell (unit cell) for generating electricity.

In the fuel cell, a fuel gas such as a gas chiefly containing hydrogen (hereinafter also referred to as the "hydrogen-containing gas") is supplied to the anode. A gas chiefly containing oxygen or air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

Generally, a predetermined number of, e.g., several tens to several hundreds of fuel cells are stacked together to form a fuel cell stack for achieving the desired level of electricity in power generation. Components of the fuel cell stack need to be tightened together reliably under pressure so that the internal resistance of the fuel cell does not increase, and the sealing performance for preventing leakage of reactant gases is maintained.

In this regard, for example, a fuel cell stack disclosed in Japanese Laid-Open Patent Publication No. 2001-135344 is known. As shown in FIG. 34, the fuel cell stack includes a stack body 2 formed by stacking a plurality of unit cells 1. At opposite ends of the stack body 2 in the stacking direction, end plates 3 are provided. Further, auxiliary plates 4a, 4b are provided outside the end plates 3. A pair of tightening bands 5 is provided along both sides of the stack body 2. At ends of the tightening bands 5 and the auxiliary plates 4a, 4b, cylindrical coupling members 6 are provided. The coupling members 6 have holes arranged in a straight line. A metal pin 7 is inserted into each of the coupling members 6 for coupling the tightening bands 5 and the auxiliary plates 4a, 4b together.

According to the disclosure, a plurality of bolts 8 are screwed into the auxiliary plate 4a. A plurality of belleville springs 9 are provided on the auxiliary plate 4b. Therefore, when the bolts 8 are screwed into the auxiliary plate 4a, the end plates 3 are pressed downwardly, and the belleville springs 9 on the auxiliary plate 4b are compressed. Thus, the required tightening pressure is applied to the stack body 2 through the pair of end plates 3.

In Japanese Laid-Open Patent Publication No. 2001-135344, the metal pins 7 are fitted into both of the coupling members 6 of the tightening bands 5 and the coupling members 6 of the auxiliary plates 4a, 4b. Therefore, the distance between the auxiliary plates 4a, 4b does not change. Thus, when the tightening load applied to the fuel cell stack is reduced by aged deterioration or the like, it is necessary to tighten the plurality of bolts 8 for maintaining the desired tightening load.

However, in Japanese Laid-Open Patent Publication No. 2001-135344, in order to adjust the tightening load applied to the fuel cell stack, the bolts 8 as dedicated components for tightening are required. Therefore the additional dedicated components increase the weight of the fuel cell stack, and the size of the fuel cell stack in the stacking direction of the unit cells 1 disadvantageously.

As a solution of the above problem, for example, a fuel cell stack disclosed in Japanese Laid-Open Patent Publication No. 2002-298901 is known. In the fuel cell stack, current collecting electrodes (terminal plates) are provided on the outside of a stack body formed by stacking a predetermined number of unit cells. Further, end plates are provided outside the terminal plates. The end plates are coupled to a casing by a hinge mechanism. The casing includes a plurality of panels (side plates) provided on upper, lower, left, and right sides between the end plates.

Therefore, in Japanese Laid-Open Patent Publication No. 2002-298901, the bolts 8 disclosed in Japanese Laid-Open Patent Publication No. 2001-135344 are not required. Further, it is possible to use thin end plates. Thus, it is possible to achieve reduction in the overall size and weight of the fuel cell stack easily.

In Japanese Laid-Open Patent Publication No. 2002-298901, for example, a relatively large gap may be formed between the side plates of the casing and the sides of the stack body. Therefore, when an impact is applied to the fuel cell stack, positional displacement may occur in the stack body in the stacking direction, or the stack body may be vibrated undesirably. If the gap between the side plates and the sides of the stack body is excessively small, the side plates and the stack body contact unnecessarily.

Further, the panels of the casing have a flat shape. For example, if a load is applied to the fuel cell stack in a twisting direction, or if vibrations are generated, deformation may occur in the panels. Thus, the position of the stack body may be displaced in the stacking direction. In this case, for example, the sealing performance is degraded undesirably.

In view of the above, for example, a rib-panel having ribs may be adopted to increase the rigidity of the panel. However, since the tightening load is applied to the stack body in the stacking direction, when the load in the stacking direction is applied to the rib-panel, the rib-panel may be deformed undesirably by the load.

SUMMARY OF THE INVENTION

A general object of the present invention is to provide a fuel cell stack having a simple and economical structure in which it is possible to adjust a gap or a state of the contact between a casing and a stack body.

Further, a main object of the present invention is to provide a fuel cell stack having a light weight and compact structure in which it is possible to desirably maintain the rigidity of the casing, and reliably apply the desired tightening load in the stacking direction of a stack body.

Further, another main object of the present invention is to provide a fuel cell stack having a simple structure, in which a gap between a side plate of a casing and a stack body is adjusted suitably, and a state of the contact between the side plate and the stack body can be determined arbitrarily.

The present invention relates to a fuel cell stack including a box-shaped casing and a stack body. The stack body is formed by stacking a plurality of unit cells. Each of the unit cells includes an electrolyte electrode assembly and separators sandwiching the electrolyte electrode assembly. The electrolyte electrode assembly includes a pair of electrodes, and an electrolyte interposed between the electrodes.

The casing includes end plates provided at opposite ends of the stack body in the stacking direction, a plurality of side plates provided on sides of the stack body, and coupling pins each for coupling the end plate and the side plate. The side plates include a first side plate and a second side plate provided adjacent to each other. The first side plate includes a flange for attaching the first side plate to the second side plate, and the center of the coupling pin for coupling the first side plate to the end plate is offset from a neutral surface of the first side plate.

The neutral surface of the first side plate herein means a surface in which the theoretical stress and distortion are estimated to be "0 (zero)" (a surface in which no compression occurs) when a bending stress is applied to the first side plate, assuming that the deformation in the cross section of the side plate is very small. The center of the coupling pin is provided on the neutral surface of the first side plate. Stated otherwise, the neutral axis of the first side plate (the intersection line between the neutral surface and the cross section) and the central axis of the coupling pin are on the same plane.

Further, it is preferable that the width of the first side plate is smaller than the width of the second side plate. The load in the longitudinal direction applied to the first side plate on the short side is considerably small in comparison with the load in the longitudinal direction applied to the second side plate on the long side. Therefore, deformation of the first side plate by the offset is small. Thus, with the simple structure, deformation of the first and second side plates by the load in the longitudinal direction is reduced effectively.

Further, according to another aspect of the present invention, the casing includes end plates provided at opposite ends of the stack body in the stacking direction, a plurality of side plates provided on sides of the stack body, and coupling pins each for coupling the end plate and the side plate. At least one of the side plates is a rib-panel, and the center of the coupling pin is provided on the neutral surface of the rib-panel.

The neutral surface of the rib-panel herein means a surface in which the theoretical stress and distortion are estimated to be "0 (zero)" (a surface in which no compression occurs) when a bending stress is applied to the rib-panel, assuming that the deformation in the cross section of the panel is very small. The center of the coupling pin is provided on the neutral surface of the rib-panel. Stated otherwise, the neutral axis of the rib-panel (the intersection line between the neutral surface and the cross section) and the central axis of the coupling pin are on the same plane.

Further, it is preferable that the position of a rib of the rib-panel is determined such that the center of the plate thickness of the rib-panel is provided on the neutral surface. The rib may be formed integrally with the panel. Alternatively, the rib may be formed separately from the panel, and attached to the panel.

Further, according to still another aspect of the present invention, the casing includes end plates provided at opposite ends of the stack body in the stacking direction, a plurality of side plates provided on sides of the stack body, and coupling pins each for coupling the end plate and the side plate. In at least one of the side plates, the center of the coupling pin is offset from a neutral surface of the side plate such that the side plate has a deformation portion which is deformed along the stacking direction of the stack body.

Further, it is preferable that at least one of the side plates is a rib-panel including a panel and a rib which is formed integrally with or separately from the panel. In the structure, it is possible to improve the rigidity of the side plate itself.

In the present invention, by applying a tightening load to the stack body, when a load is applied to the coupling pin along the stacking direction, the center of the coupling pin is offset from the neutral surface of the first side plate. Therefore, a force in a bending direction is applied to the first side plate.

At this time, if the center of the coupling pin is offset from the neutral surface of the first side plate inwardly, i.e., toward the stack body, the first side plate is deformed (bent) toward the stack body. Thus, for example, it is possible to effectively reduce the positional displacement or vibrations in the stack body due to the impact outside the stack body.

If the center of the coupling pin is offset from the neutral surface of the first side plate outwardly, i.e., in a direction away from the stack body, the first side plate is deformed (bent) in the direction away from the stack body. Therefore, a desired space is formed between the first side plate and the stack body. Thus, it is possible to prevent the first side plate from contacting the stack body unnecessarily. With the simple structure, it is possible to suitably adjust the gap and the state of contact between the first side plate of the casing and the stack body.

Further, the first side plate has the flange for attaching the first side plate to the second side plate. Therefore, no separate coupling member is additionally required. Thus, it is possible to reduce the weight, the number of components, and the cost of the fuel cell stack effectively.

Further, in the present invention, the casing includes at least one rib-panel. The rigidity of the rib-panel is better than the rigidity of the planar panel. Therefore, even if a load is applied to the casing in a direction different from the stacking direction such as a twisting direction, it is possible to effectively maintain the shape of the casing by the rib, and the casing is not affected by vibrations outside the casing or the like. When the stack body is deformed in a direction that intersects the stacking direction, the amount of displacement in the stack body is reduced effectively.

Further, by applying a tightening load to the stack body, when a load is applied to the coupling pin in the stacking direction, since the center of the coupling pin is provided on the neutral surface of the rib-panel, it is possible to prevent the force in a bending direction from being applied to the rib-panel. With the lightweight and compact structure, the rigidity of the casing is maintained suitably. It is possible to inhibit the positional displacement in the stack body, and it is possible to reliably apply the desired tightening load to the stack body in the stacking direction.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
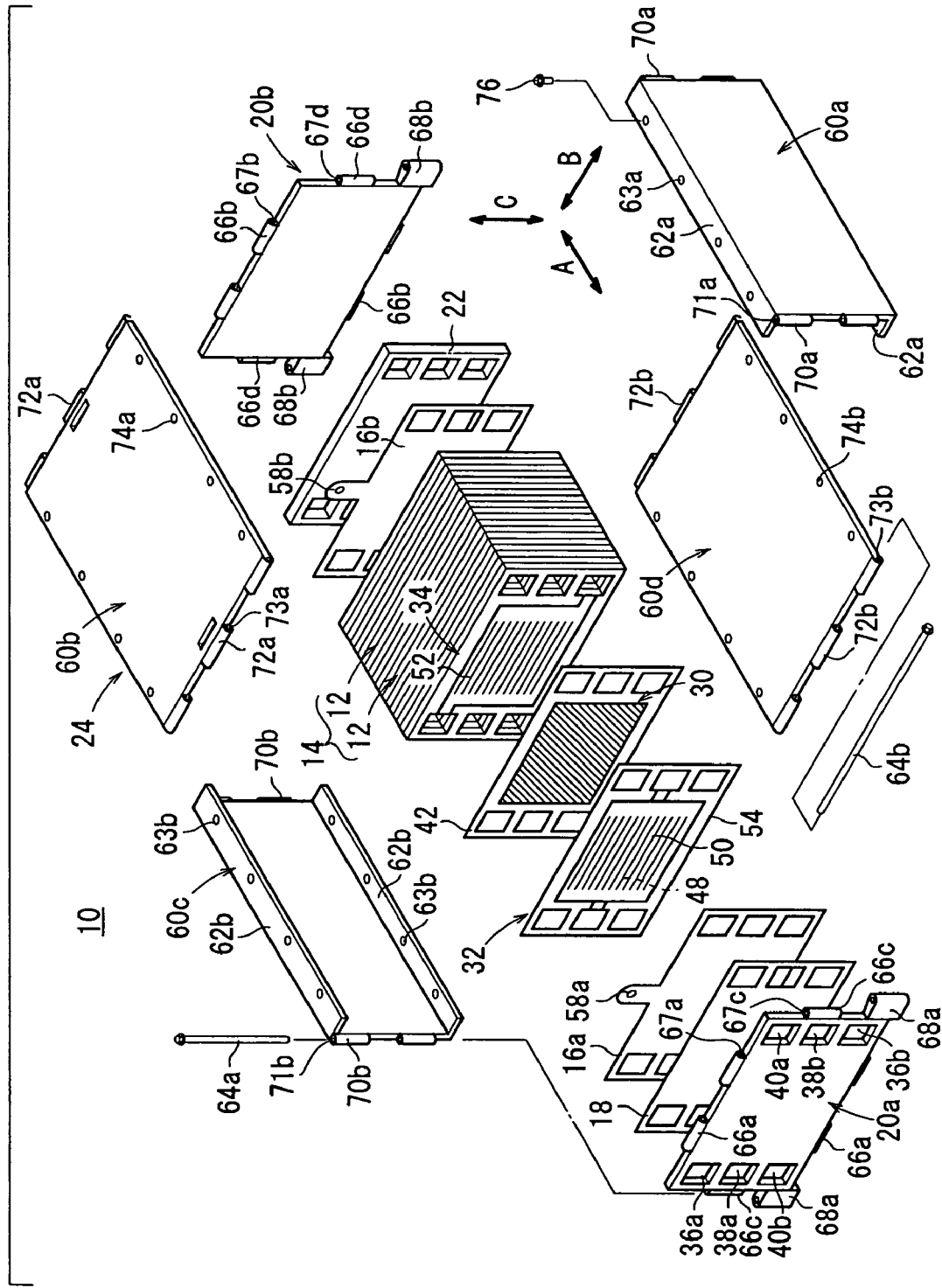
FIG. 1 is a partial exploded perspective view schematically showing a fuel cell stack according to a first embodiment of the present invention.
Figure 2:
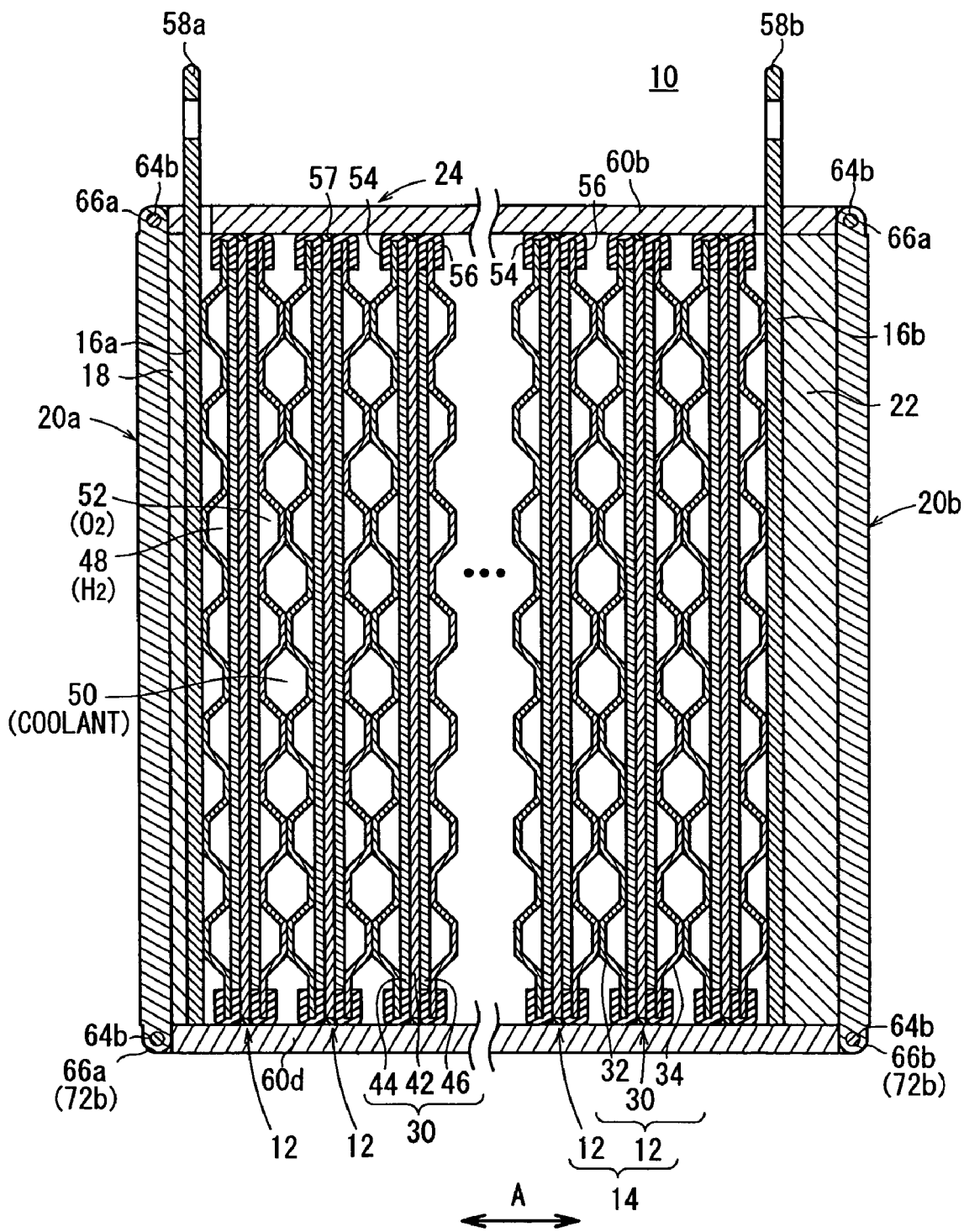
FIG. 2 is a cross sectional side view showing the fuel cell stack.

FIG. 1 is a partial exploded perspective view schematically showing a fuel cell stack 10 according to a first embodiment of the present invention. FIG. 2 is a cross sectional side view showing part of the fuel cell stack 10.

As shown in FIG. 1, the fuel cell stack 10 includes a stack body 14 formed by stacking a plurality of unit cells 12 horizontally in a stacking direction indicated by an arrow A. At one end of the stack body 14 in the stacking direction indicated by the arrow A, a terminal plates 16a is provided. An insulating plate 18 is provided outside the terminal plate 16a. Further, an end plate 20a is provided outside the insulating plate 18. At the other end of the stack body 14 in the stacking direction, a terminal plate 16b is provided. An insulating spacer member 22 is provided outside the terminal plate 16b. Further, an end plate 20b is provided outside the insulating spacer member 22. Each of the end plates 20a, 20b has a rectangular shape. The fuel cell stack 10 is assembled together such that the stack body 14 formed by stacking the unit cells 12 is housed in a casing 24 including the end plates 20a, 20b.

Figure 3:
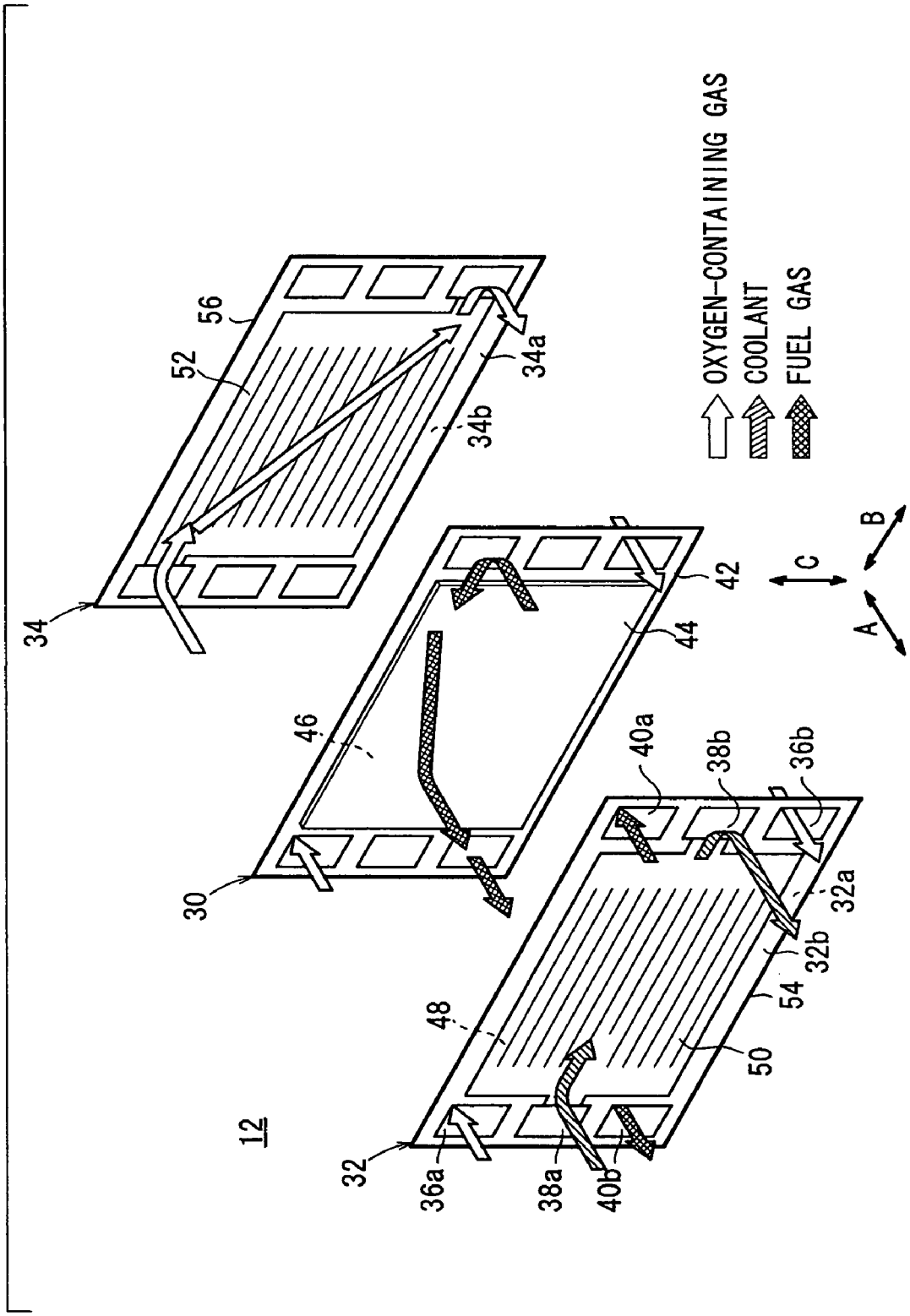
FIG. 3 is an exploded perspective view showing a unit cell of the fuel cell stack.

As shown in FIGS. 2 and 3, each of the unit cells 12 includes a membrane electrode assembly (electrolyte electrode assembly) 30 and thin corrugated plates as first and second metal separators 32, 34 sandwiching the membrane electrode assembly 30. Instead of using the first and second metal separators 32, 34, for example, carbon separators may be used.

At one end of the unit cell 12 in a longitudinal direction indicated by an arrow B in FIG. 3, an oxygen-containing gas supply passage 36a for supplying an oxygen-containing gas, a coolant supply passage 38a for supplying a coolant, and a fuel gas discharge passage 40b for discharging a fuel gas such as a hydrogen-containing gas are provided. The oxygen-containing gas supply passage 36a, the coolant supply passage 38a, and the fuel gas discharge passage 40b extend through the unit cell 12 in the direction indicated by the arrow A.

At the other end of the unit cell 12 in the longitudinal direction, a fuel gas supply passage 40a for supplying the fuel gas, a coolant discharge passage 38b for discharging the coolant, and an oxygen-containing gas discharge passage 36b for discharging the oxygen-containing gas are provided. The fuel gas supply passage 40a, the coolant discharge passage 38b, and the oxygen-containing gas discharge passage 36b extend through the unit cell 12 in the direction indicated by the arrow A.

The membrane electrode assembly 30 includes an anode 44, a cathode 46, and a solid polymer electrolyte membrane 42 interposed between the anode 44 and the cathode 46. The solid polymer electrolyte membrane 42 is formed by impregnating a thin membrane of perfluorosulfonic acid with water, for example.

Each of the anode 44 and the cathode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 44 and the electrode catalyst layer of the cathode 46 are fixed to both surfaces of the solid polymer electrolyte membrane 42, respectively.

The first metal separator 32 has a fuel gas flow field 48 on its surface 32a facing the membrane electrode assembly 30.

The fuel gas flow field 48 is connected to the fuel gas supply passage 40a at one end, and connected to the fuel gas discharge passage 40b at the other end. The fuel gas flow field 48 includes a plurality of grooves extending in the direction indicated by the arrow B, for example. Further, the first metal separator 32 has a coolant flow field 50 on the other surface 32b. The coolant flow field 50 is connected to the coolant supply passage 38a at one end, and connected to the coolant discharge passage 38b at the other end. The coolant flow field 50 includes a plurality of grooves extending in the direction indicated by the arrow B.

The second metal separator 34 has an oxygen-containing gas flow field 52 on its surface 34a facing the membrane electrode assembly 30. The oxygen-containing gas flow field 52 is connected to the oxygen-containing gas supply passage 36a at one end, and connected to the oxygen-containing gas discharge passage 36b at the other end. The oxygen-containing gas flow field 52 includes a plurality of grooves extending in the direction indicated by the arrow B. The other surface 34b of the second metal separator 34 is stacked on the surface 32b of the adjacent first metal separator 32. When the first metal separator 32 and the second metal separator 34 are stacked together, the coolant flow field 50 is formed between the surface 32b of the first metal separator 32 and the surface 34b of the second metal separator 34.

A first seal member 54 is formed integrally on the surfaces 32a, 32b of the first metal separator 32 around the outer end of the first metal separator 32. On the surface 32a, the first seal member 54 is formed around the fuel gas supply passage 40a, the fuel gas discharge passage 40b, and the fuel gas flow field 48 for preventing leakage of the fuel gas, while allowing the fuel gas to flow between the fuel gas supply passage 40a and the fuel gas flow field 48, and between the fuel gas flow field 48 and the fuel gas discharge passage 40b. Further, on the surface 32b, the first seal member 54 is formed around the coolant supply passage 38a, the coolant discharge passage 38b, and the coolant flow field 50 for preventing leakage of the coolant, while allowing the coolant to flow between the coolant supply passage 38a and the coolant flow field 50, and between the coolant flow field 50 and the coolant discharge passage 38b.

A second seal member 56 is formed integrally on the surfaces 34a, 34b of the second metal separator 34 around the outer end of the second metal separator 34. On the surface 34a, the second seal member 56 is formed around the oxygen-containing gas supply passage 36a, the oxygen-containing gas discharge passage 36b, and the oxygen-containing gas flow field 52, and prevents leakage of the oxygen-containing gas, while allowing the oxygen-containing gas to flow between the oxygen-containing gas supply passage 36a and the oxygen-containing gas flow field 52, and between the oxygen-containing gas flow field 52 and the oxygen-containing gas discharge passage 36b. Further, on the surface 34b, the second seal member 56 is formed around the coolant supply passage 38a, the coolant discharge passage 38b, and the coolant flow field 50, and prevents leakage of the coolant while allowing the coolant to flow between the coolant supply passage 38a and the coolant flow field 50, and between the coolant flow field 50 and the coolant discharge passage 38b.

As shown in FIG. 2, a seal 57 is interposed between the first seal member 54 and the second seal member 56. Therefore, the outer circumferential of the solid polymer electrolyte membrane 42 does not directly contact the casing 24.

As shown in FIGS. 1 and 2, plate-shaped terminals 58a, 58b extend straight from the surfaces from the terminal plates 16a, 16b, respectively. The terminals 58a, 58b are connected to a load such as a motor of a vehicle.

As shown in FIG. 1, the casing 24 includes the end plates 20a, 20b, a plurality of side plates 60a to 60d, and coupling pins 64a, 64b. The side plates 60a to 60d are provided on sides of the stack body 14. The coupling pins 64a, 64b are used for coupling the end plates 20a, 20b and the side plates 60a to 60d. The coupling pins 64b are longer than the coupling pins 64a. The side plates 60a to 60d are thin metal plates.

Each of upper and lower ends of the end plate 20a has two first coupling portions 66a. Each of upper and lower ends of the end plate 20b has two first coupling portions 66b. Each of left and right ends of the end plate 20a has one first coupling portion 66c. Each of left and right ends of the end plate 20b has one first coupling portion 66d. The first coupling portions 66a to 66d have through holes 67a to 67d, respectively. The end plate 20a has mounting bosses 68a on its left and right ends at lower positions. The end plate 20b has mounting bosses 68b on its left and right ends at lower positions. The bosses 68a, 68b are fixed to mounting positions (not shown) using bolts or the like for installing the fuel cell stack 10 in a vehicle, for example.

The side plates (first side plates) 60a, 60c are provided on opposite sides of the stack body 14 in the direction indicated by the arrow B. Each end of the side plate 60a in the longitudinal direction indicated by the arrow A has two second coupling portions 70a. Each end of the side plate 60c in the longitudinal direction indicated by the arrow A has two second coupling portions 70b. The second coupling portions 70a, 70b have through holes 71a, 71b, respectively. Each end of the side plate 60a in the lateral direction indicated by the arrow C has a flange 62a. Each end of the side plate 60b in the lateral direction indicated by the arrow C has a flange 62b. The flanges 62a, 62b are bent inwardly (toward the stack body 14) at an angle of substantially 90°. Each of the flanges 62a has a plurality of screw holes 63a, and each of the flanges 62b has a plurality of screw holes 63b.

The side plate 60b is provided on the upper side of the stack body 14, and the side plate 60d is provided on the lower side of the stack body 14. The width of the side plates (second side plates) 60b, 60d is larger than the width of the side plates 60a, 60c. The side plates 60b, 60d form long sides of the casing 24, and the side plates 60a, 60c form short sides of the casing 24. Each longitudinal end of the side plate 60b has three second coupling portions 72a. Each longitudinal end of the side plate 60d has three second coupling portions 72b. The coupling portions 72a, 72b have holes 73a, 73b, respectively. Each end of the side plate 60b in the lateral direction indicated by the arrow B has holes 74a. Each end of the side plate 60d in the lateral direction indicated by the arrow B has holes 74b. Screws 76 are inserted into the holes 74a, 74b, and fitted to the screw holes 63a, 63b for fixing the side plates 60a to 60d together.

In assembling the end plates 20a, 20b and the side plates 60a to 60d, the first coupling portions 66c of the end plate 20a, and the first coupling portions 66d of the end plate 20b are positioned between the second coupling portions 70a of the side plate 60a, and between the second coupling portions 70b of the side plate 60c. The short coupling pins 64a are inserted into these coupling portions 66c, 66d, 70a, 70b for coupling the side plates 60a, 60c, and the end plates 20a, 20b.

Likewise, the second coupling portions 72a of the side plate 60b and the first coupling portions 66a, 66b of the upper end of the end plates 20a, 20b are positioned alternately, and the second coupling portions 72b of the side plate 60d and the first coupling portions 66a, 66b of the lower end of the end plates 20a, 20b are positioned alternately. The long coupling pins 64b are inserted into these coupling portions 66a, 66b, 72*a*, 72*b* for coupling the side plates 60*b*, 60*d* and the end plates 20*a*, 20*b*. In this manner, the casing 24 is assembled (see FIG. 4).

Figure 5:
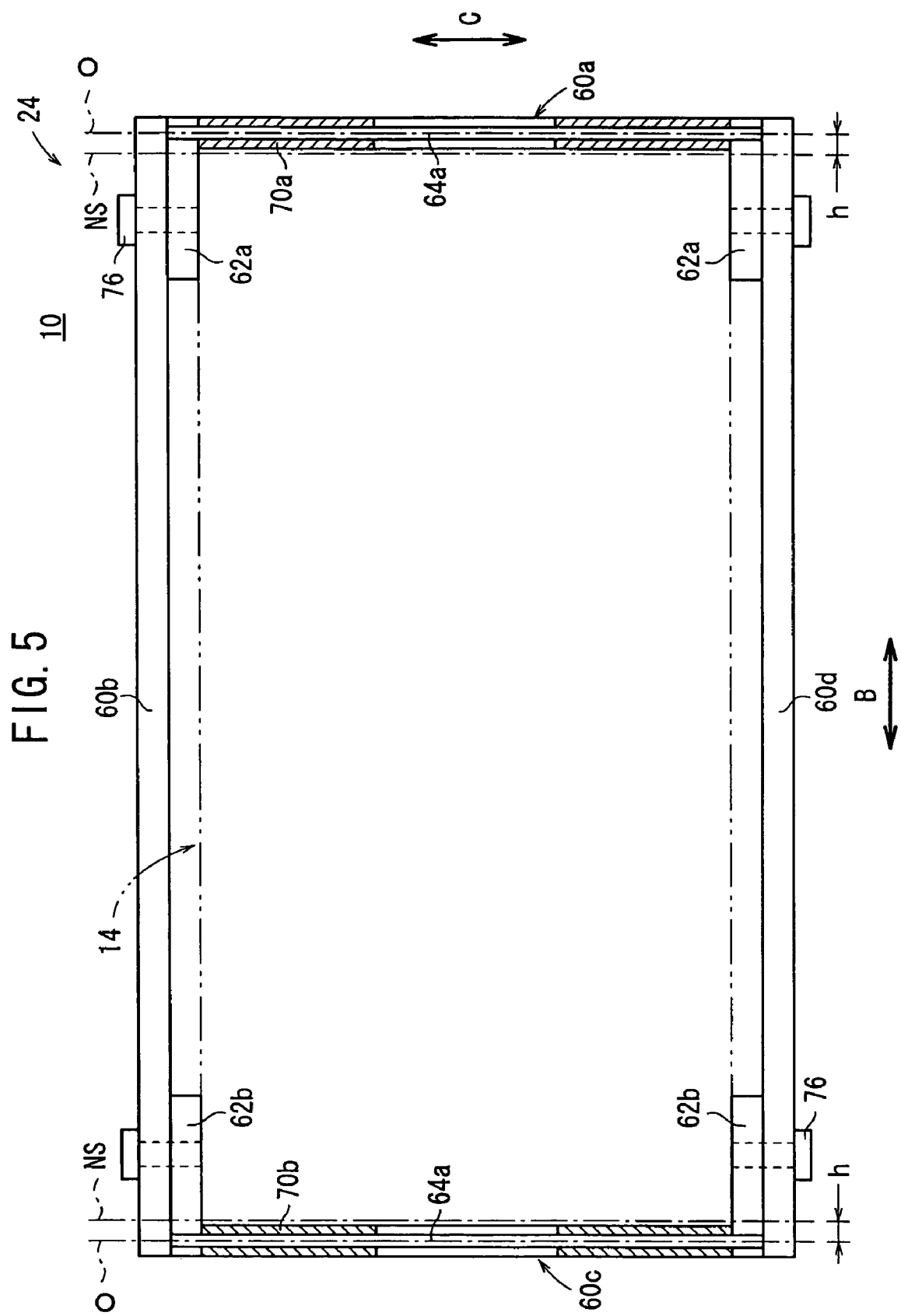
FIG. 5 is a view showing a casing of the fuel cell stack.
Figure 6:
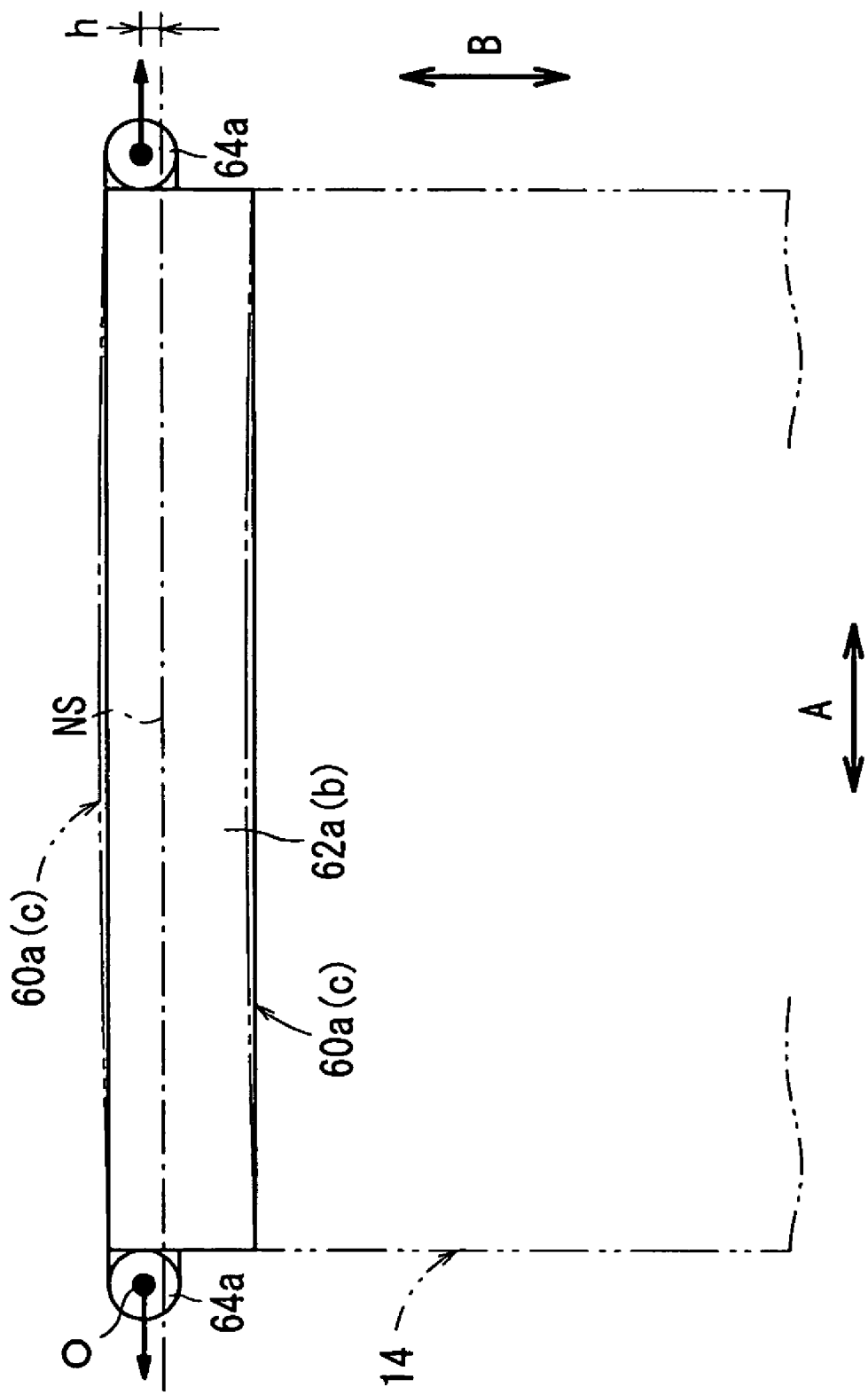
FIG. 6 is a view showing operation of a side plate of the casing.

As shown in FIGS. 5 and 6, in the side plate 60*a*, the center O of the coupling pin 64*a* is offset outwardly from the neutral surface NS of the side plate 60*a* in a direction away from the stack body 14 by the distance "h". A load in the direction indicated by the arrow A is applied to the pair of coupling pins 64*a* provided at opposite ends of the side plate 60*a* in the longitudinal direction. Therefore, as shown in FIG. 6, a load for deforming the side plate 60*a* in a direction away from the stack body 14 is applied to the side plate 60*a* along the stacking direction indicated by the arrow A. The load applied to the side plate 60*a* on the short side is considerably smaller than the load applied to the side plates 60*b*, 60*d* on the long sides.

As shown in FIG. 1, the structure of the side plate 60*c* is the same as the structure of the side plate 60*a*, and detailed description thereof is omitted.

As shown in FIGS. 1 and 2, the spacer member 22 has a rectangular shape having predetermined dimensions such that the spacer member 22 is positioned inside the casing 24. The thickness of the spacer member 22 is selected such that the dimensional variation in the stacking direction of the stack body 14 is absorbed, and the desired tightening force is applied to the stack body 14. If it is possible to absorb variation of the length in the stacking direction of the stack body 14 by elasticity of the first and second metal separators 32, 34, the spacer members 22 may not be used.

Next, operation of the fuel cell stack 10 will be described.

Figure 4:
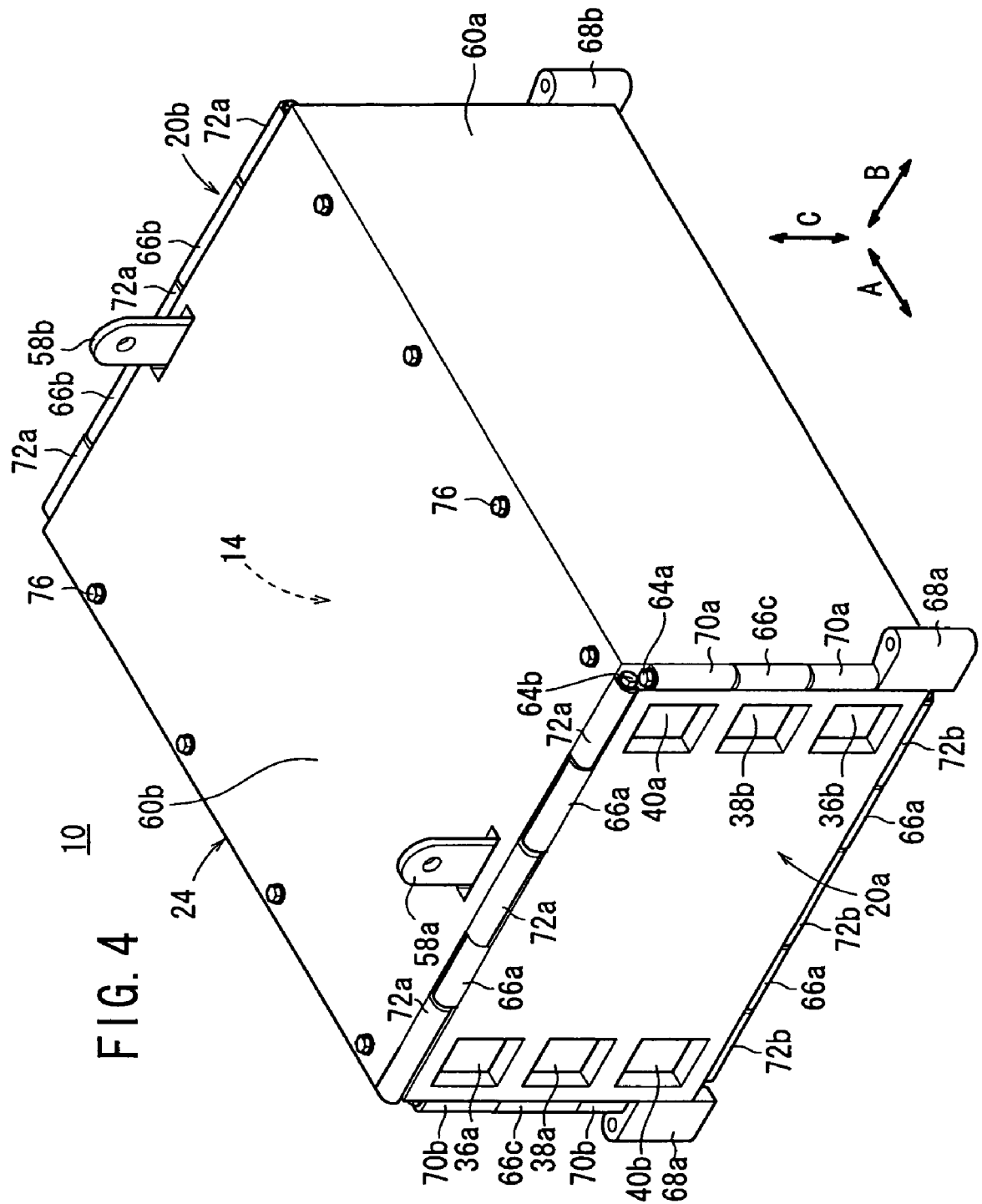
FIG. 4 is a perspective view showing the fuel cell stack.

In the fuel cell stack 10, as shown in FIG. 4, an oxygen-containing gas is supplied to the oxygen-containing gas supply passage 36*a* from the end plate 20*a* of the fuel cell stack 10. A fuel gas such as a hydrogen-containing gas is supplied to the fuel gas supply passage 40*a*. Further, a coolant such as pure water, an ethylene glycol is supplied to the coolant supply passage 38*a*. Thus, the oxygen-containing gas, the fuel gas, and the coolant are supplied to each of the unit cells 12 stacked together in the direction indicated by the arrow A to form the stack body 14. The oxygen-containing gas, the fuel gas, and the coolant flow in the direction indicated by the arrow A.

As shown in FIG. 3, the oxygen-containing gas flows from the oxygen-containing gas supply passage 36*a* into the oxygen-containing gas flow field 52 of the second metal separator 34. The oxygen-containing gas flows along the cathode 46 of the membrane electrode assembly 30 for inducing an electrochemical reaction at the cathode 46. The fuel gas flows from the fuel gas supply passage 40*a* into the fuel gas flow field 48 of the first metal separator 32. The fuel gas flows along the anode 44 of the membrane electrode assembly 30 for inducing an electrochemical reaction at the anode 44.

Thus, in each of the membrane electrode assemblies 30, the oxygen-containing gas supplied to the cathode 46, and the fuel gas supplied to the anode 44 are consumed in the electrochemical reactions at catalyst layers of the cathode 46 and the anode 44 for generating electricity.

After the oxygen in the oxygen-containing gas is consumed at the cathode 46, the oxygen-containing gas flows into the oxygen-containing gas discharge passage 36*b*, and is discharged to the outside from the end plate 20*a*. Likewise, after the fuel gas is consumed at the anode 44, the fuel gas flows into the fuel gas discharge passage 40*b*, and is discharged to the outside from the end plate 20*a*.

The coolant flows from the coolant supply passage 38*a* into the coolant flow field 50 between the first and second metal separators 32, 34, and flows in the direction indicated by the arrow B. After the coolant is used for cooling the membrane electrode assembly 30, the coolant flows into the coolant discharge passage 38*b*, and is discharged to the outside from the end plate 20*a*.

In the first embodiment, as shown in FIGS. 5 and 6, in the side plate 60*a* or 60*c* having the small width, the center O of the coupling pin 64*a* is offset from the neutral surface NS of the side plate 60*a* or 60*c* in the direction away from the stack body 14 by the distance "h". Therefore, when a tightening load is applied to the fuel cell stack 10 in the stacking direction, a large load in the direction indicated by the arrow A is applied to each of the side plates 60*b*, 60*d* having the large width, through the pair of coupling pins 64*b*. The load applied to the side plates 60*a*, 60*c* in the direction indicated by the arrow A through the pair of coupling pins 64*a* is considerably small in comparison with the load applied to the side plates 60*b*, 60*d*.

Thus, in the side plate 60*a* or 60*c*, even if the center O of the coupling pin 64*a* is offset from the neutral surface NS of the side plate 60*a* or 60*c* by the distance "h", the side plate 60*a* or 60*c* is deformed only slightly in the direction away from the stack body 14 (see FIG. 6). Therefore, for example, it is possible to reliably and easily fabricate the desired casing 24 without limiting the positions of the coupling pins 64*a*.

Figure 7:
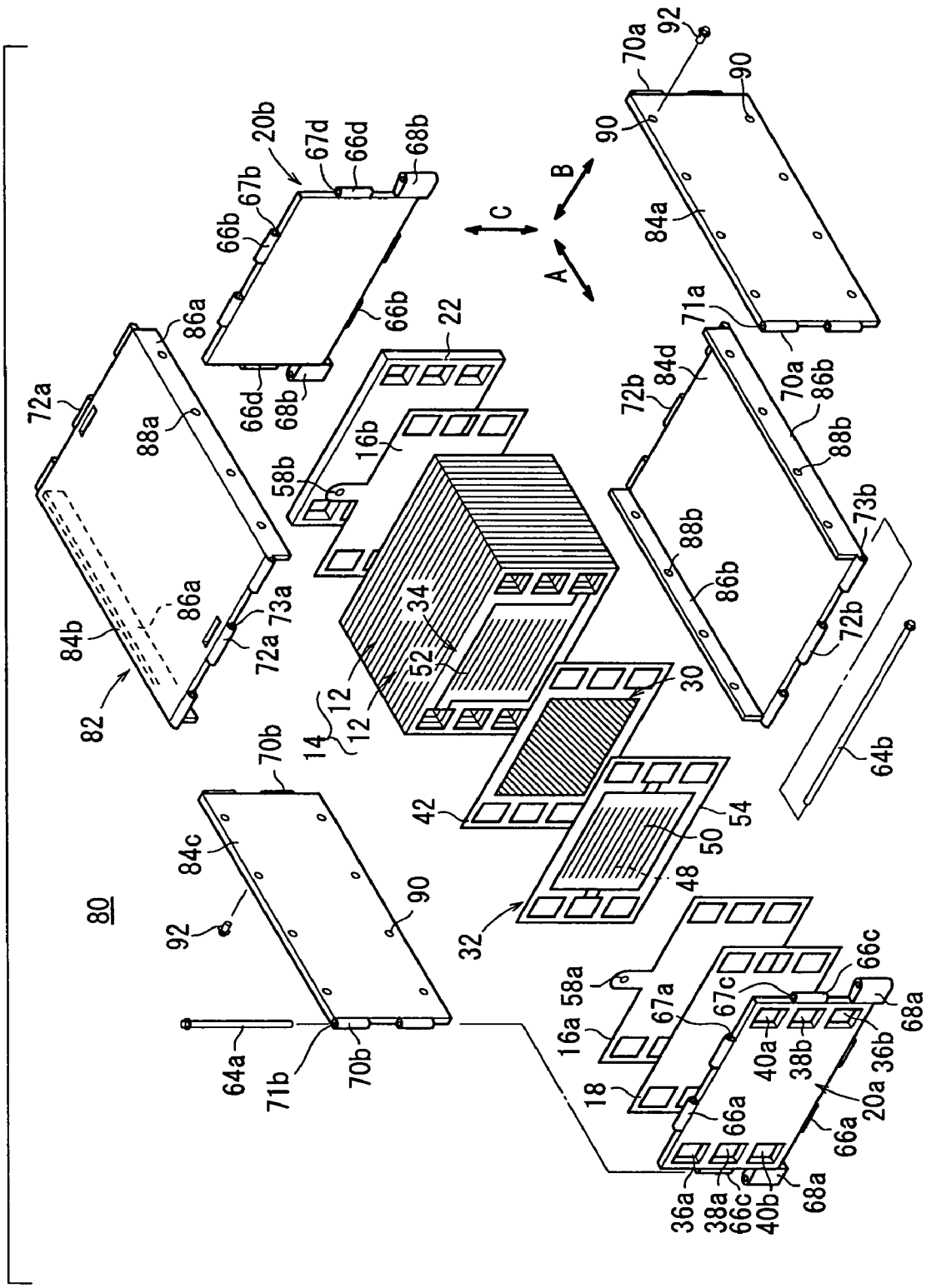
FIG. 7 is a partial exploded perspective view schematically showing a fuel cell stack according to a second embodiment of the present invention.
Figure 8:
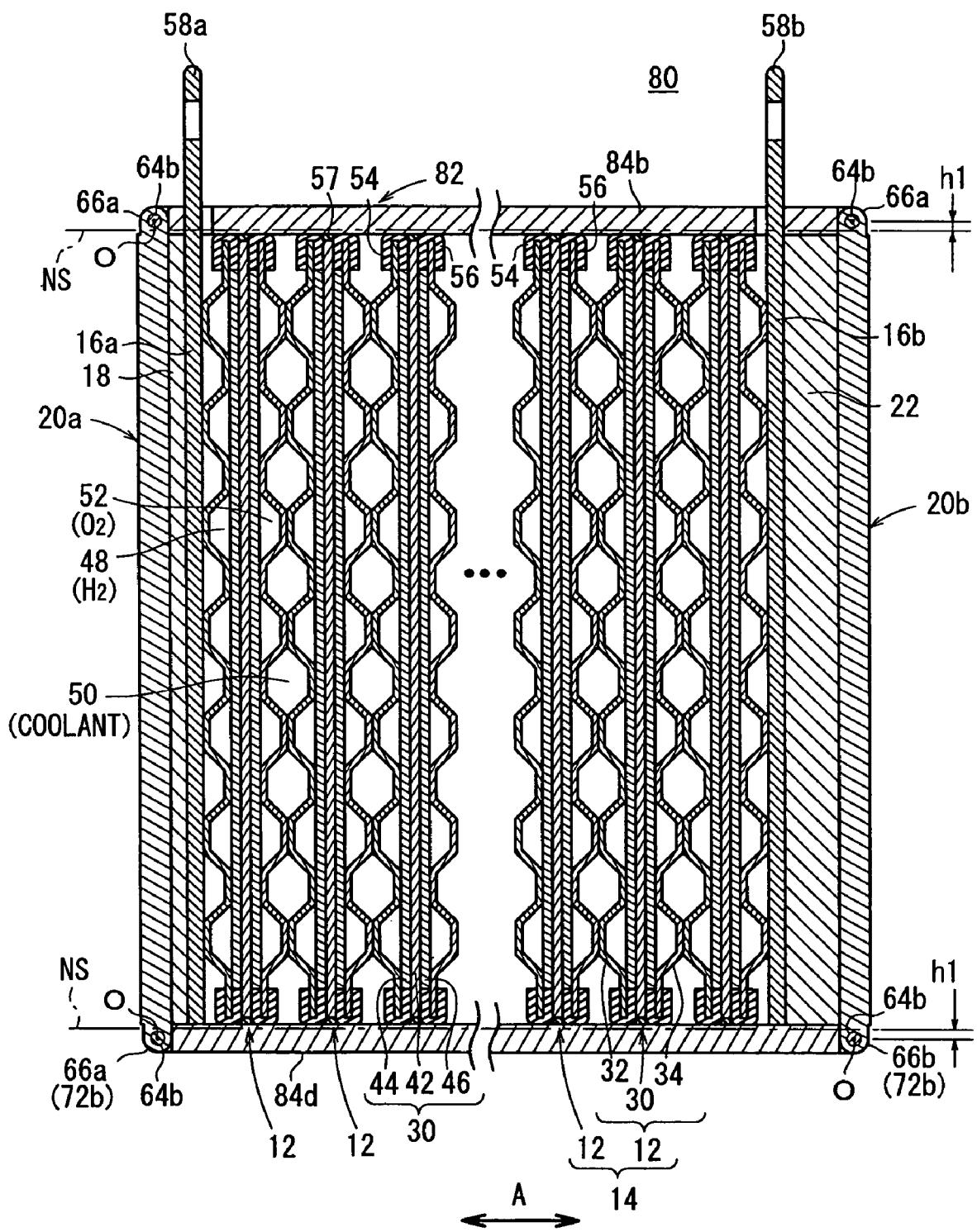
FIG. 8 is a cross sectional side view showing the fuel cell stack.

FIG. 7 is a partial exploded perspective view schematically showing a fuel cell stack 80 according to a second embodiment of the present invention. FIG. 8 is a cross sectional side view showing part of the fuel cell stack 80.

A casing 82 of the fuel cell stack 80 includes end plates 20*a*, 20*b*, and side plates 84*a* to 84*d* connected by coupling pins 64*a*, 64*b*. The side plates 84*b*, 84*d* are provided on upper and lower sides of the stack body 14. The side plates 84*a*, 84*c* are provided at opposite sides of the stack body 14 in the direction indicated by the arrow B. The width of the side plates 84*b*, 84*d* is larger than the width of the side plates 84*a*, 84*c*. At opposite marginal ends of the side plates 84*b*, 84*d* in the lateral direction indicated by the arrow B, attachment flanges 86*a*, 86*b* are provided.

Each of the flanges 86*a*, 86*b* has a plurality of screw holes 88*a*, 88*b*. At marginal ends of the side plates 84*a*, 84*c* in the lateral direction indicated by the arrow C, a plurality of holes 90 are formed. The screws 92 are inserted into the holes 90, and fitted to the screw holes 88*a*, 88*b*. Thus, the side plates 84*a* to 84*d* are fixed together.

As shown in FIG. 8, in each of the side plates 84*b*, 84*d*, the center O of the coupling pin 64*b* is offset from the neutral surface NS of the side plate 84*b* or 84*d* in a direction away from the stack body 14 by the distance "h1".

Figure 9:
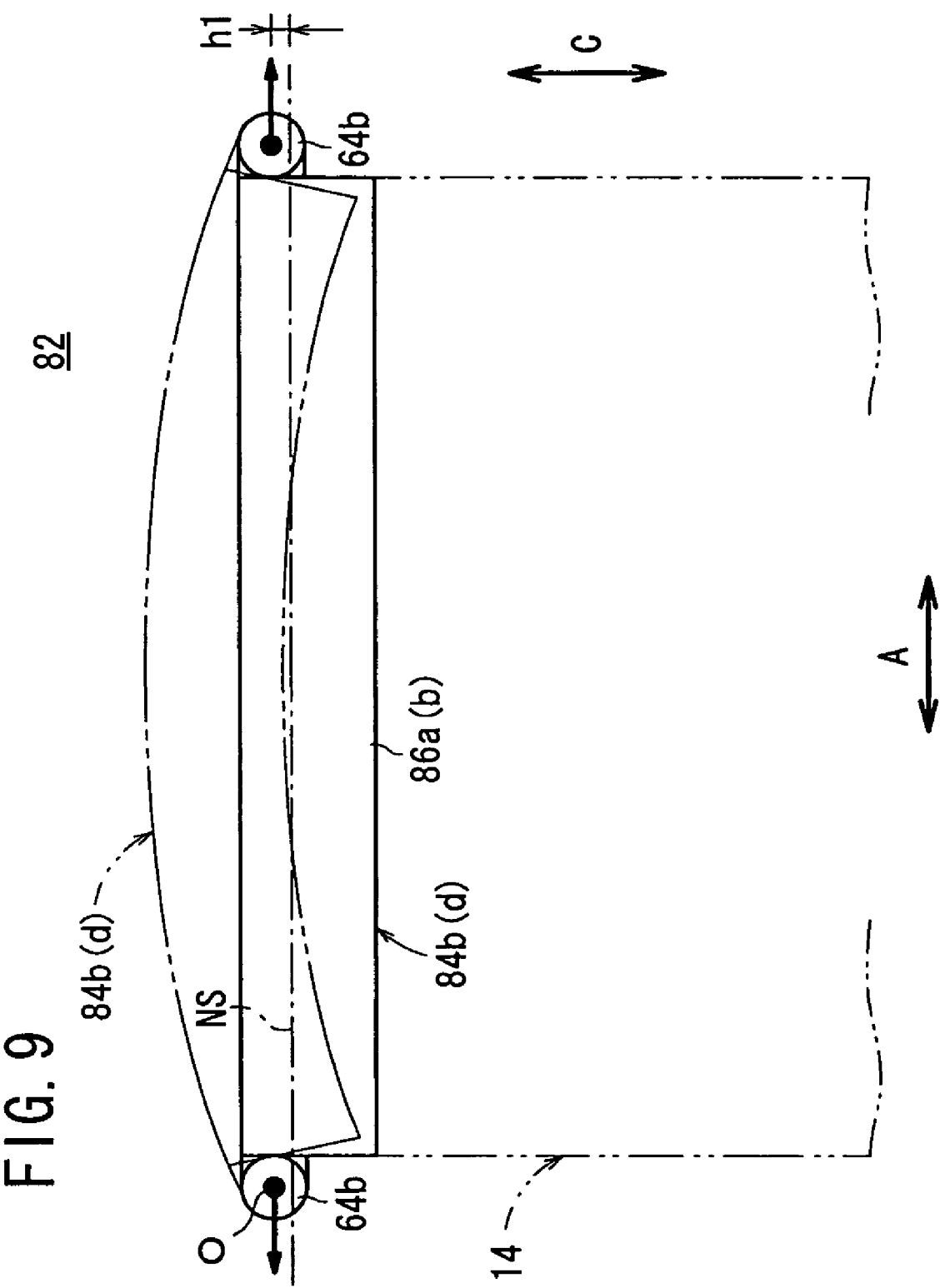
FIG. 9 is a view showing operation of a side plate of a casing of the fuel cell stack.

In the second embodiment, when a stacking load is applied to the stack body 14, as shown in FIG. 9, the side plates 84*b*, 84*d* are pulled through the pair of coupling pins 64*b* in the direction indicated by the arrow A. In the structure, the center O of the coupling pin 64*b* is offset from the neutral surface NS of the side plate 84*b* or 84*d* in a direction away from the stack body 14. Therefore, the side plates 84*b*, 84*d* are deformed in the direction away from the stack body 14.

In particular, since the width of the side plates 84*b*, 84*d* is larger than the width of the side plates 84*a*, 84*c*, the load applied to the side plates 84*b*, 84*d* in the stacking direction is larger than the load applied to the side plates 84*a*, 84*c* in the stacking direction. The side plates 84*b*, 84*d* are reliably spaced from the sides of the stack body 14. Thus, the side plates 84*b*, 84*d* do not contact the stack body 14 unnecessarily.

Further, by selecting the position of the center O of the coupling pin 64*b* for adjusting the distance "h1", it is possible to adjust the deformation amount of the side plates 84*b*, 84*d* easily. If the center O of the coupling pin 64b is offset from the neutral surface NS of the side plates 84b, 84d toward the stack body 14, the side plates 84b, 84d are deformed toward the stack body 14 by the load in the stacking direction. In this case, the side plates 84b, 84d contact the stack body 14 to support the stack body 14.

Figure 10:
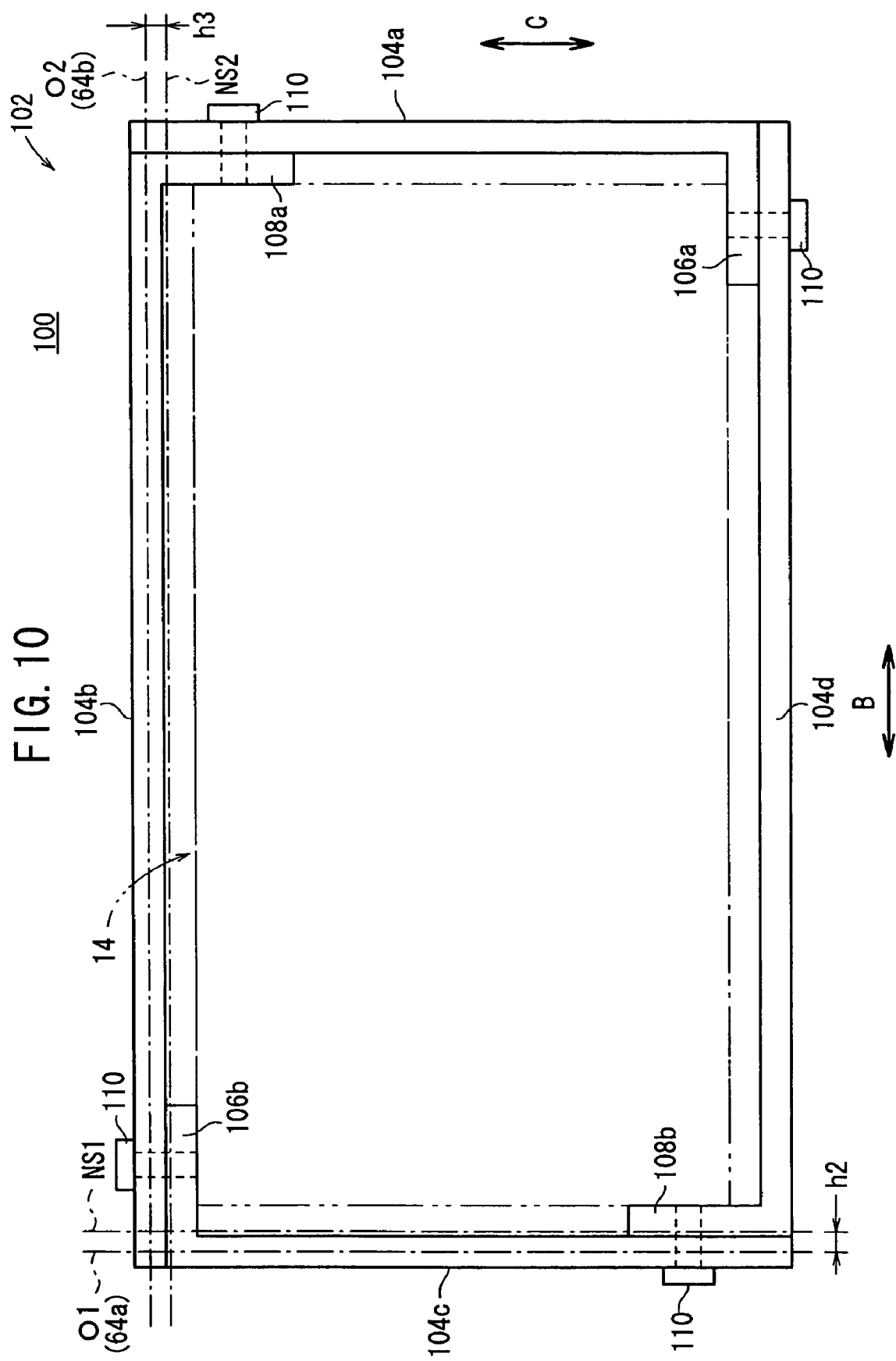
FIG. 10 is a view showing a casing of a fuel cell stack according to a third embodiment of the present invention.

FIG. 10 is a view showing a casing 102 of a fuel cell stack 100 according to a third embodiment of the present invention.

The casing 102 includes side plates 104a to 104d. The side plates 104a to 104d have substantially L-shaped cross section. Attachment flanges 106a, 106b are provided at diagonal positions, i.e., at one end of the side plate 104a in the lateral direction indicated by the arrow C, and at one end of the side plate 104c in the lateral direction indicated by the arrow C. Likewise, attachment flanges 108a, 108b are provided at diagonal positions, i.e., at one end of the side plate 104b in the lateral direction indicated by the arrow B, and at one end of the side plate 104d in the lateral direction indicated by the arrow B.

The other end of the side plate 104a and the flange 108a, the other end of the side plate 104b and the flange 106b, the other end of the side plate 104c and the flange 108b, and the other end of the side plate 104d and the flange 106a are fixed by a plurality of screws 110. Thus, the side plates 104a to 104d are fixed with each other.

The center O1 of the coupling pin 64a is offset from the neutral surface NS1 of the side plate 104a or 104c in a direction away from the stack body 14 by the distance "h2". The center O2 of the coupling pin 64b is offset from the neutral surface NS2 of the side plate 104b or 104d in a direction away from the stack body 14 by the distance "h3".

In the third embodiment, in each of the narrow side plates 104a, 104c, the center O1 of the coupling pin 64a is offset from the neutral surface NS1 by the distance "h2". In the structure, only a considerably small load is applied to the side plates 104a, 104c in the stacking direction. Therefore, the side plates 104a, 104c are hardly deformed.

In contrast, in each of the wide side plates 104b, 104d, the center O2 of the coupling pin 64b is offset from the neutral surface NS2 in a direction away from the stack body 14. Thus, the side plates 104b, 104d are deformed in the direction away from the stack body 14.

In each of the side plates 104b and 104d, the center O2 of the coupling pin 64b may be offset from the neutral surface NS2 of the side plate 104b or 104d toward the stack body 14. In this case, the side plates 104b, 104d are deformed toward the stack body 14. Thus, in the third embodiment, the same advantages as with the first and second embodiments can be obtained.

Figure 11:
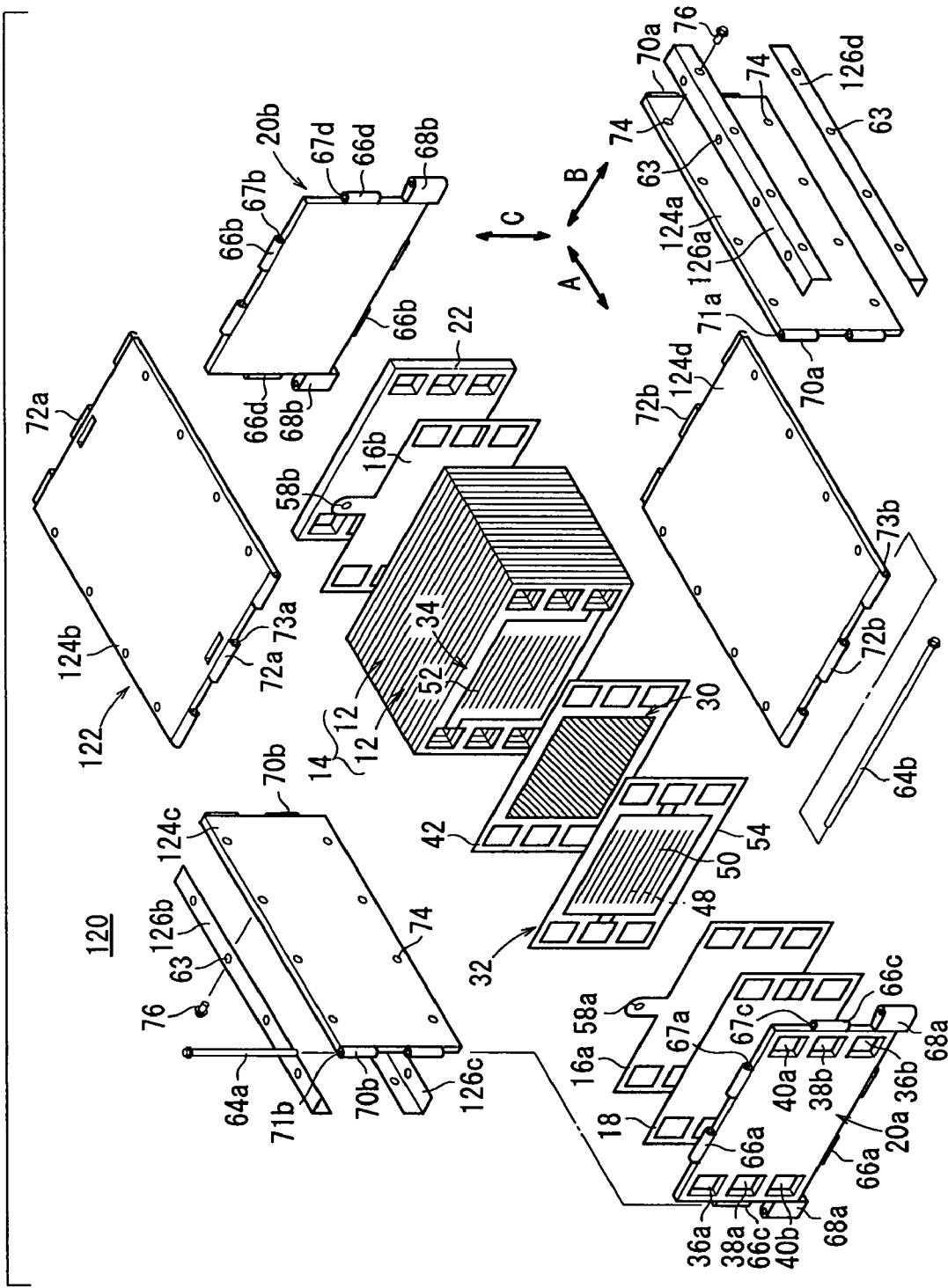
FIG. 11 is a partial exploded perspective view schematically showing a fuel cell stack according to a fourth embodiment of the present invention.
Figure 12:
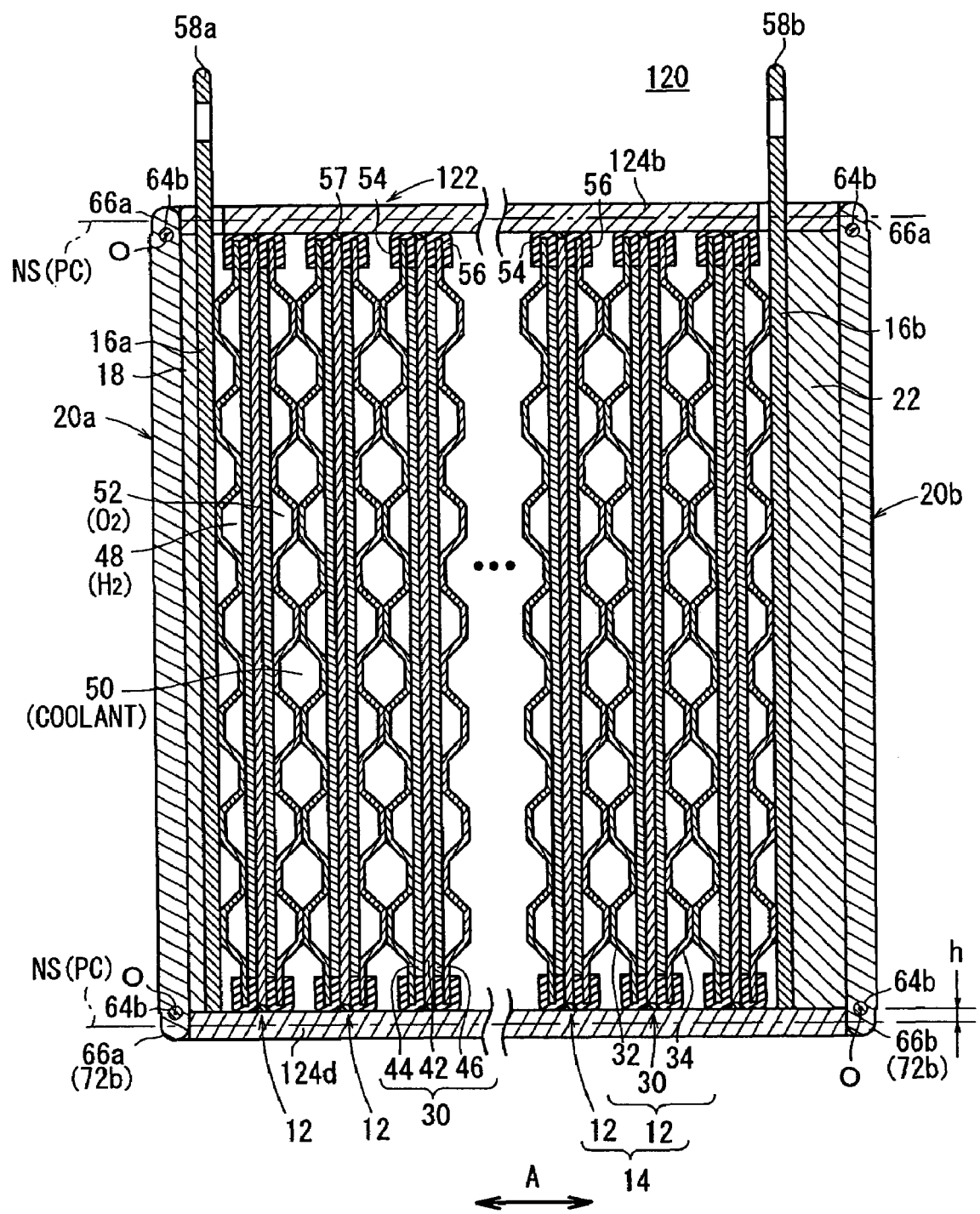
FIG. 12 is a cross sectional side view showing the fuel cell stack.

FIG. 11 is a partial exploded perspective view schematically showing a fuel cell stack 120 according to a fourth embodiment of the present invention. FIG. 12 is a cross sectional side view showing part of the fuel cell stack 120. The constituent elements that are identical to those of the fuel cell stack 10 according to the first embodiment are labeled with the same reference numeral, and description thereof will be omitted. In the fifth to thirteenth embodiments as described later, the constituent elements that are identical to those of the fuel cell stack 10 according to the first embodiment are labeled with the same reference numeral, and description thereof will be omitted.

A casing 122 of the fuel cell stack 120 includes a plurality of side plates 124a to 124d provided on sides of the stack body 14, and angle members (e.g., L angles) 126a to 126d used for coupling ends of the adjacent side plates 124a to 124d. The side plates 124a to 124d are thin metal plates.

Figure 13:
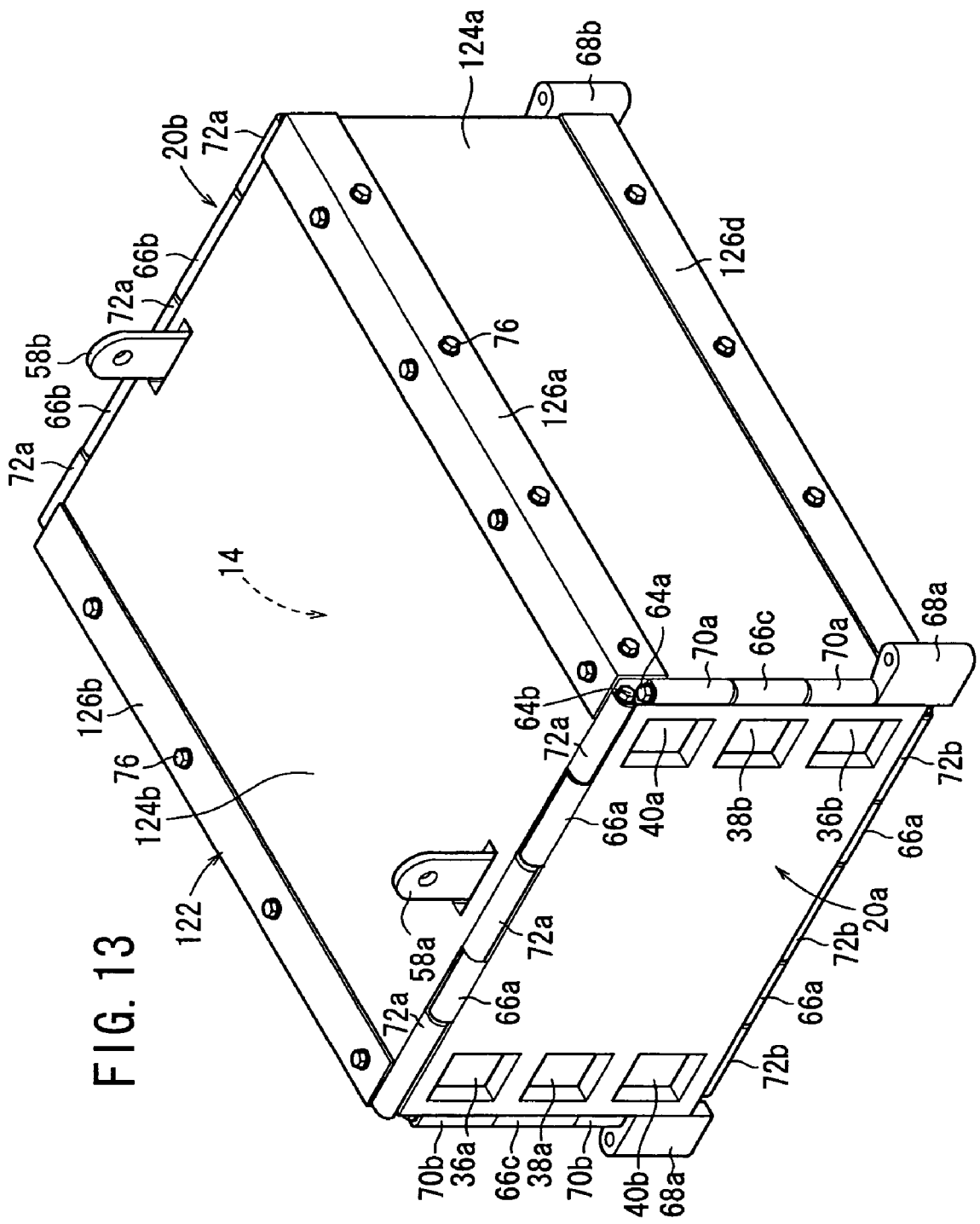
FIG. 13 is a perspective view showing the fuel cell stack.

At each opposite marginal ends of the side plates 124a to 124d in the lateral direction, a plurality of screw holes 74 are formed. On each side of the angle members 126a to 126d, holes 63 corresponding to the screw holes 74 are formed. Screws 76 are inserted into the holes 63 and fitted to the screw holes 74 for fixing the side plates 124a to 124d together through the angle members 126a to 126d. Thus, the casing 122 is formed (see FIGS. 12 and 13).

Alternatively, angle members 126a to 126d have screw holes, and the side plates 124a to 124d have holes. In this case, the angle members 126a to 126d are placed inside the side plates 124a to 124d for fixing the angle members 126a to 126d and the side plates 124a to 124d together.

Figure 14:
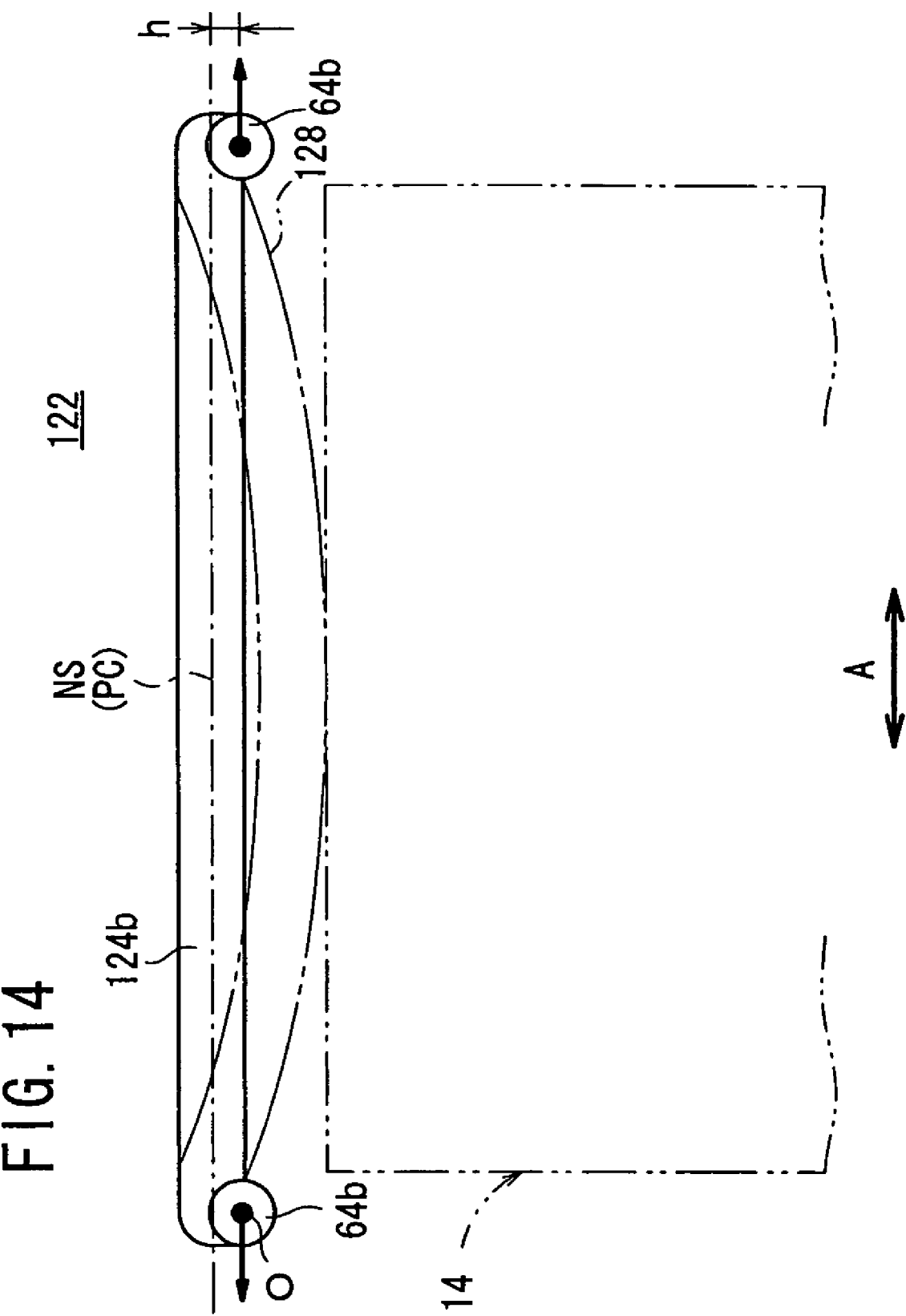
FIG. 14 is a view showing a side plate of a casing.

As shown in FIGS. 12 and 14, at least in the side plate 124b, the center PC of the plate thickness matches the neutral surface NS of the side plate 124b, and the center O of the coupling pin 64b is offset from the neutral surface NS of the side plate 124b inwardly toward the stack body 14 by the distance "h". A load in the direction indicated by the arrow A is applied to the pair of coupling pins 64b. Thus, the side plate 124b includes a deformation portion 128 along the length of the side plate 124b in the stacking direction. The deformation portion 128 of the side plate 124b is deformed toward the stack body 14 (see FIG. 14).

As shown in FIG. 12, the structure of the side plate 124d is the same as the structure of the side plate 124b, and detailed description thereof is omitted. Further, as necessary, the structures of the side plates 124a, 124c may be the same as the structure of the side plate 124b.

In the fourth embodiment, as shown in FIGS. 12 and 14, for example, in the side plate 124b, the center O of the coupling pin 64b is offset from the neutral surface NS of the side plate 124b toward the stack body 14 by the distance "h". Therefore, when a tightening load is applied to the fuel cell stack 120 in the stacking direction, a load in the stacking direction is applied to the side plate 124b through the pair of coupling pins 64b. The side plate 124b is deformed toward the stack body 14 (see FIG. 14).

Thus, the side plate 124b contacts the stack body 14 at the deformation portion 128 which is deformed toward the stack body 14 to support the stack body 14. Therefore, in the stack body 14, the positional displacement in the stacking direction or vibrations in the directions indicated by the arrows B and C are reduced effectively. With the simple structure, the desired sealing performance of the stack body 14 is achieved, and the stable power generation is performed.

Figure 15:
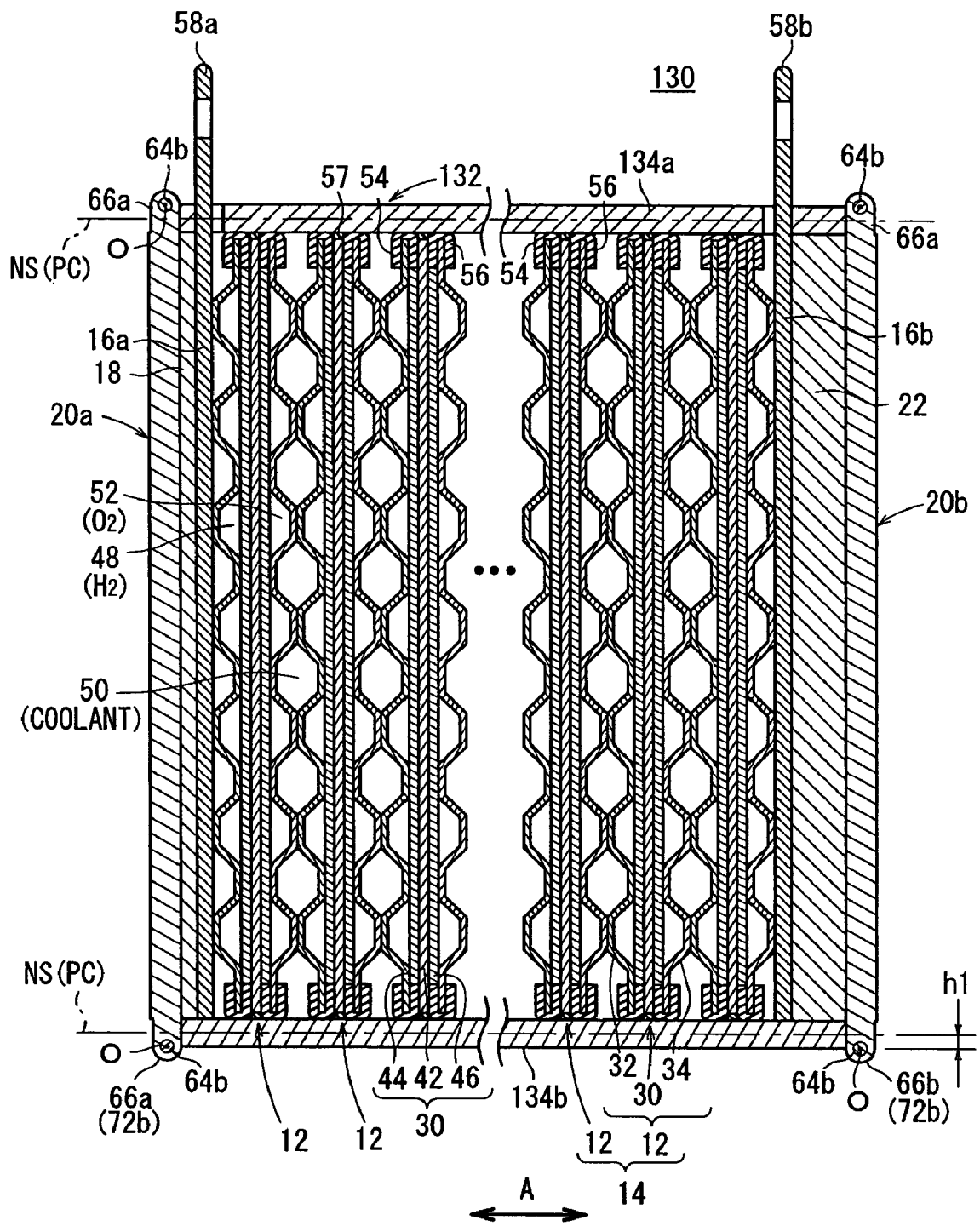
FIG. 15 is a cross sectional side view showing a fuel cell stack according to a fifth embodiment of the present invention.

FIG. 15 is a cross sectional view showing a fuel cell stack 130 according to a fifth embodiment of the present invention.

Figure 16:
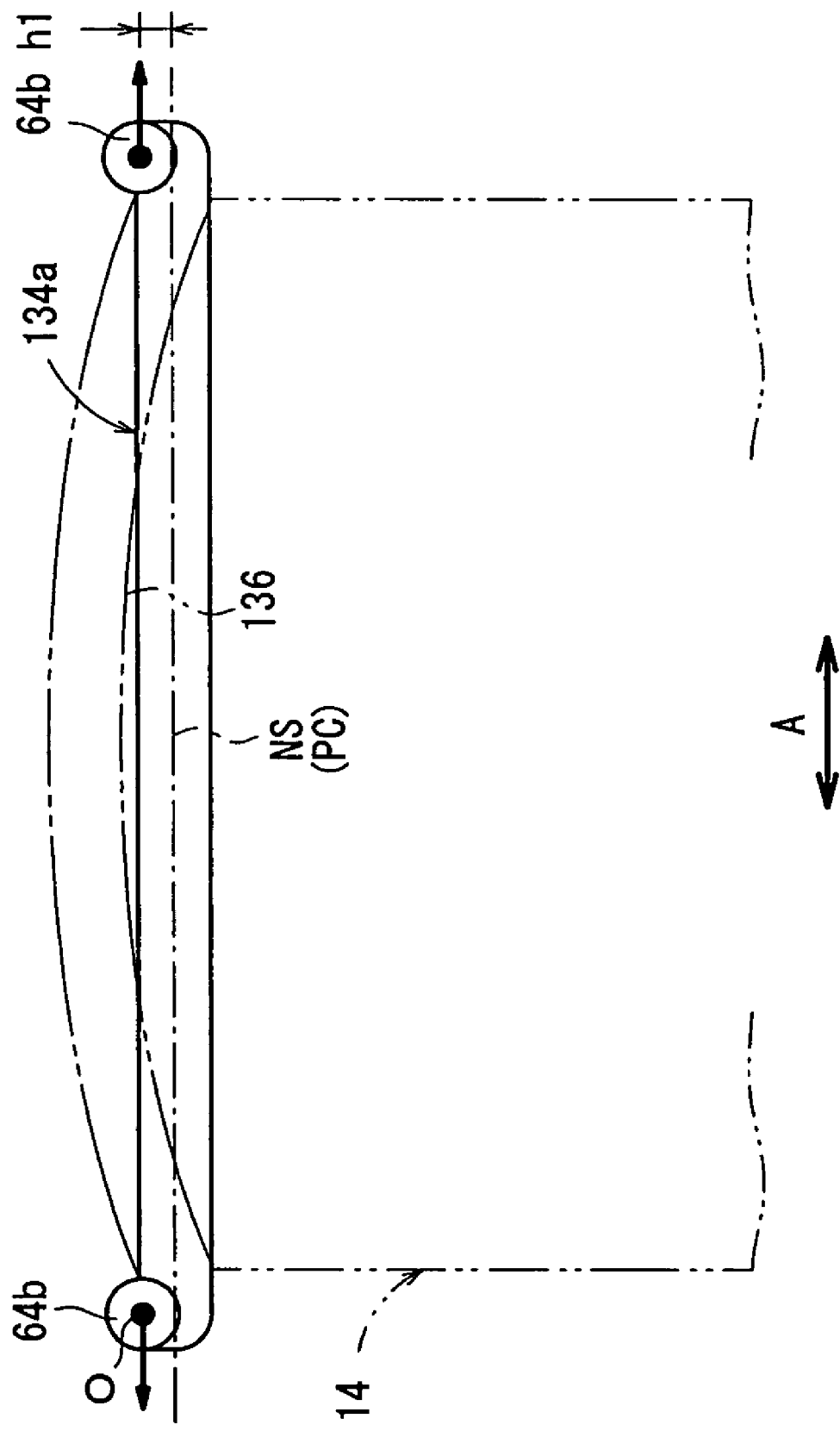
FIG. 16 is a view showing a side plate of a casing.

A casing 132 of the fuel cell stack 130 includes upper and lower side plates 134a, 134b. As shown in FIGS. 15 and 16, in the side plate 134a, the center O of the coupling pin 64b is offset from the neutral surface NS (center PC of the plate thickness) of the side plate 134a outwardly in the direction away from the stack body 14 by the distance "h1". The structure of the side plate 134b is the same as the structure of the side plate 134a, and detailed description thereof is omitted. Though not shown, at opposite ends of the stack body 14, side plates corresponding to the side plates 124a, 124c are provided, and the structures of these side plates is the same as the structure of the side plate 134a as necessary.

In the fifth embodiment, as shown in FIG. 16, when a tightening load is applied to the stack body 14, the side plate 134a is pulled in the direction indicated by the arrow A. In this case, the center O of the coupling pin 64b is offset from the neutral surface NS of the side plate 134a in the direction away from the stack body 14 by the distance "h1". Therefore, the side plate 134a includes a deformation portion 136 which is deformed in the direction away from the stack body 14.

Since the side plate 134a is spaced away from the side of the stack body 14, a desired gap is formed between the side plate 134a and the side of the stack body 14. Thus, in the fifth embodiment, the side plate 134a does not contact the stack body 14 unnecessarily.

By selectively combining the fourth embodiment and the fifth embodiment, with the simple structure, it is possible to adjust the size of the space between the stack body 14 and the casing 122 or the casing 132. Likewise, in the sixth to ninth embodiments as described later, it is possible to selectively combine the fourth to ninth embodiments.

Figure 17:
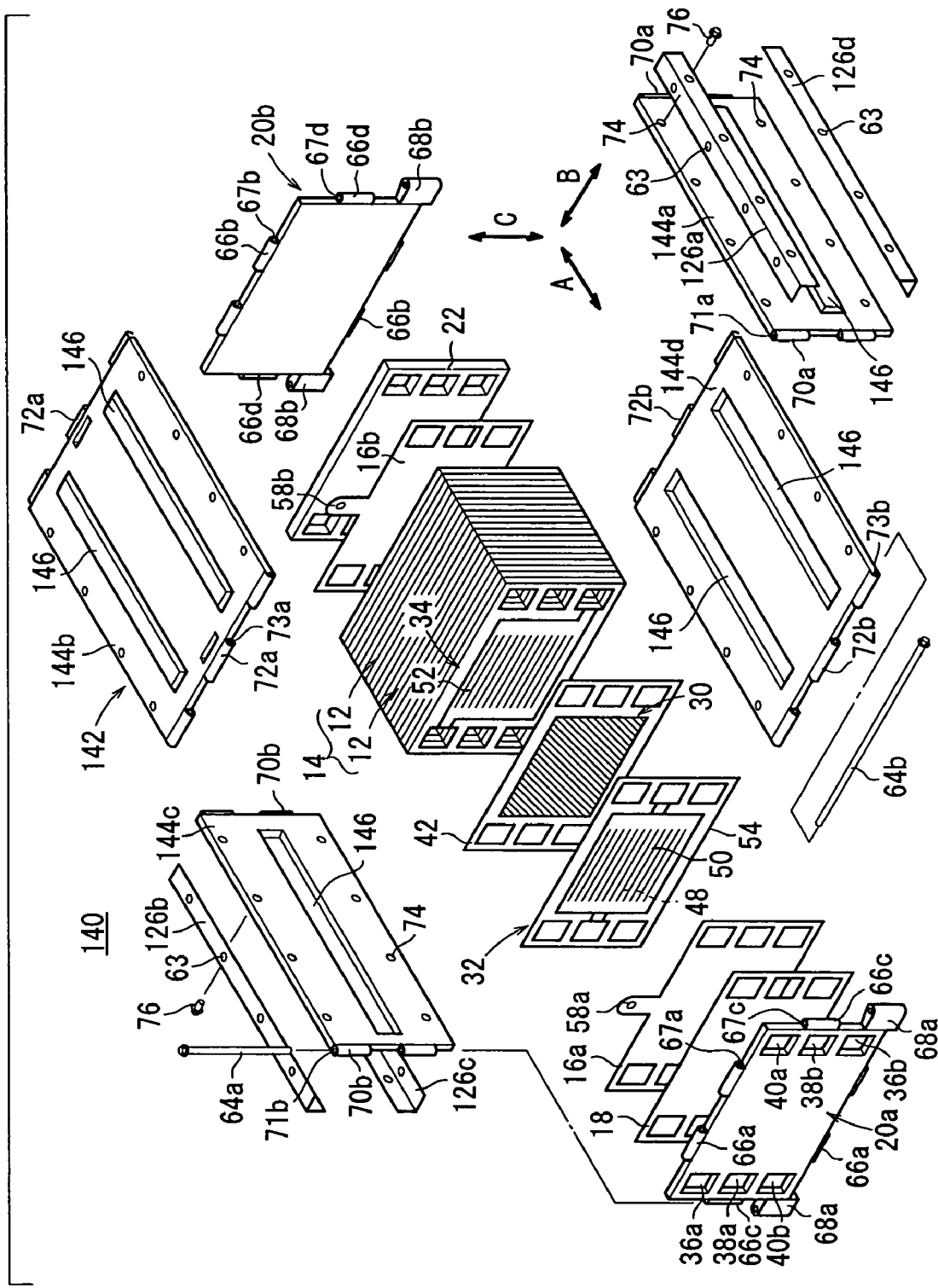
FIG. 17 is a partial exploded perspective view schematically showing a fuel cell stack according to a sixth embodiment of the present invention.
Figure 18:
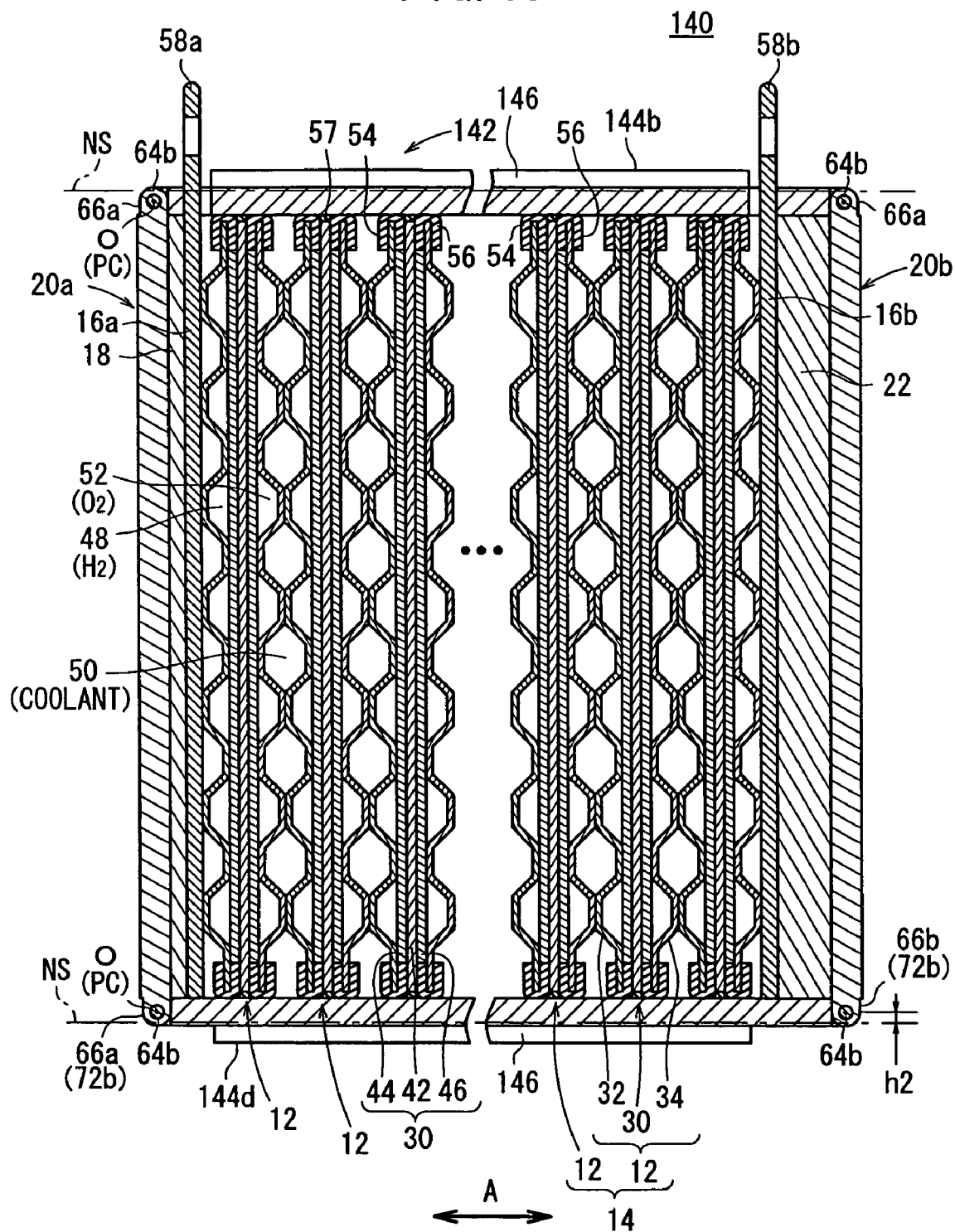
FIG. 18 is a cross sectional side view showing the fuel cell stack.

FIG. 17 is a partial exploded perspective view schematically showing a fuel cell stack 140 according to a sixth embodiment of the present invention. FIG. 18 is a cross sectional side view showing the fuel cell stack 140.

A casing 142 of the fuel cell stack 140 includes side plates 144a to 144d provided on sides of the stack body 14. Two ribs 146 extending in the stacking direction of the stack body 14 are formed integrally with at least the side plate 144b to form a rib-panel. The ribs 146 protrude in a direction away from the stack body 14. The ribs 146 improve the rigidity of the side plate 144b itself.

As shown in FIG. 18, the center O of the coupling pin 64b matches the center PC of the plate thickness of the side plat 144b, and the center O of the coupling pin 64b is offset from the neutral surface NS of the side plate 144b toward the stack body 14 by the distance "h2". The structure of the side plate 144d is the same as the structure of the side plate 144b, and detailed description thereof is omitted. Each of the side plates 144a, 144c may have a single rib 146 as necessary.

Figure 19:
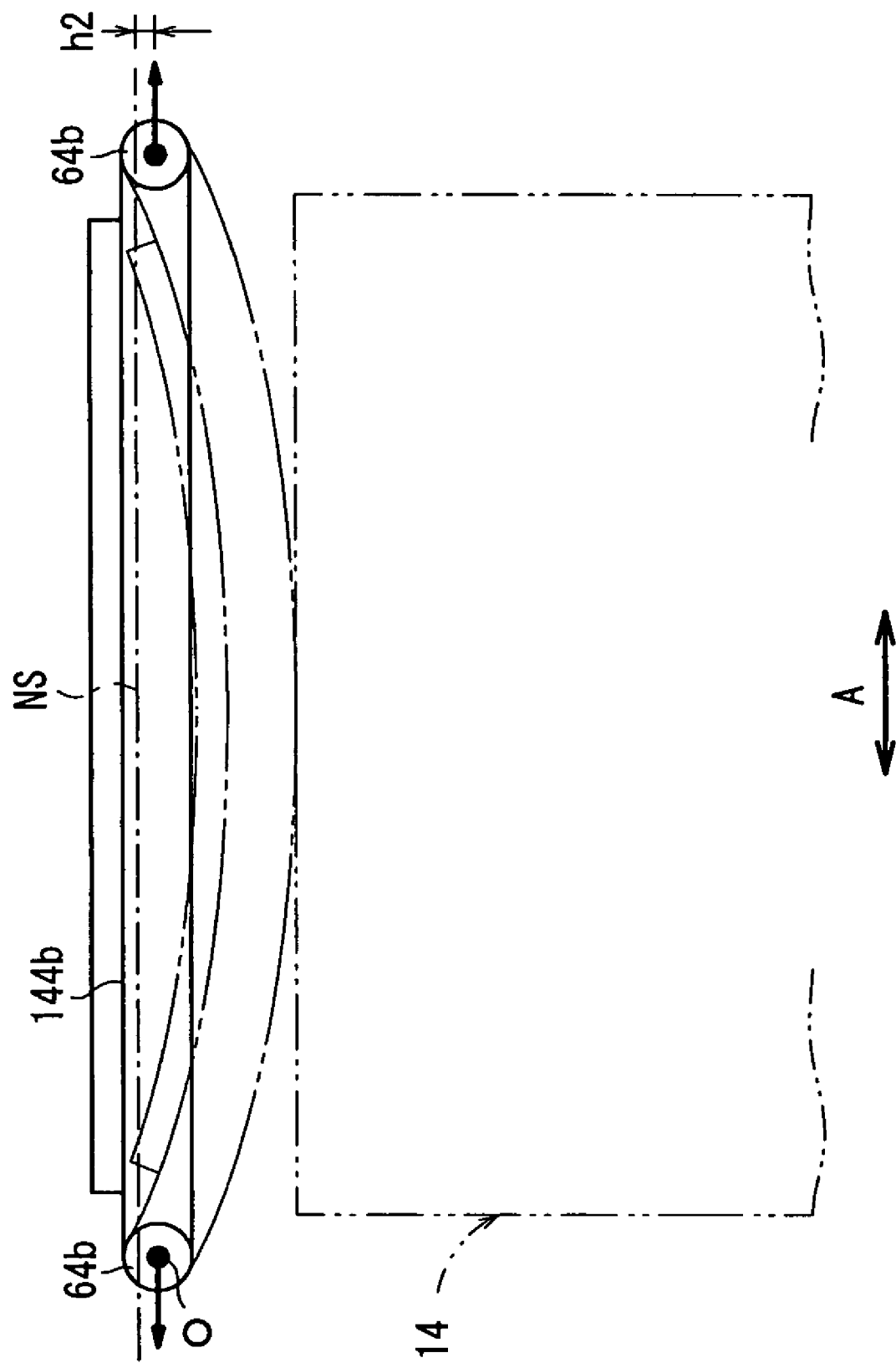
FIG. 19 is a side view showing a side plate of a casing.

In the sixth embodiment, the two ribs 146 are formed integrally with the side plate 144b to form the rib-panel. Therefore, the rigidity is improved in comparison with the planar panel. Further, the center O of the coupling pin 64b is offset from the neutral surface NS of the side plate 144b toward the stack body 14 by the distance "h2". Therefore, when a load in the stacking direction is applied between the coupling pins 64b, the side plate 144b is deformed toward the stack body 14 (see FIG. 19). Thus, in the sixth embodiment, the same advantages as with the fourth embodiment can be obtained.

Figure 20:
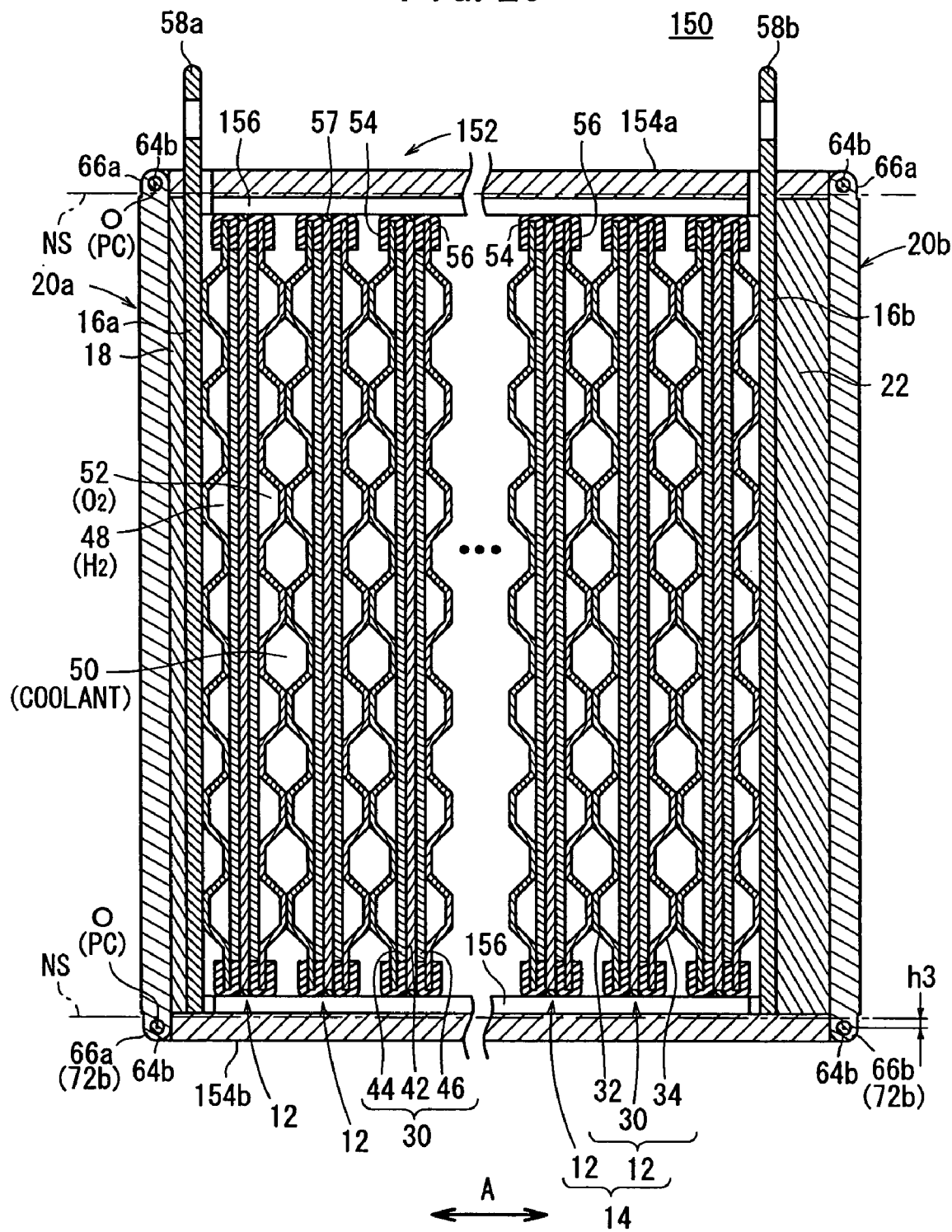
FIG. 20 is a cross sectional view showing a fuel cell stack according to a seventh embodiment of the present invention.

FIG. 20 is a cross sectional view showing a fuel cell stack 150 according to a seventh embodiment of the present invention.

A casing 152 of the fuel cell stack 150 includes side plates 154a, 154b provided on upper and lower sides of the stack body 14. A plurality of, e.g., two ribs 156 extending in the direction indicated by the arrow A are formed integrally with at least the side plate 154a to form a rib-panel.

The ribs 156 protrude toward the stack body 14. The center O of the coupling pin 64b matches the center PC of the plate thickness of the side plat 154a, and the center O of the coupling pin 64b is offset from the neutral surface NS of the side plate 154a in the direction away from the stack body 14 by the distance "h3". The structure of the side plate 154b is the same as the structure of the side plate 154a.

Figure 21:
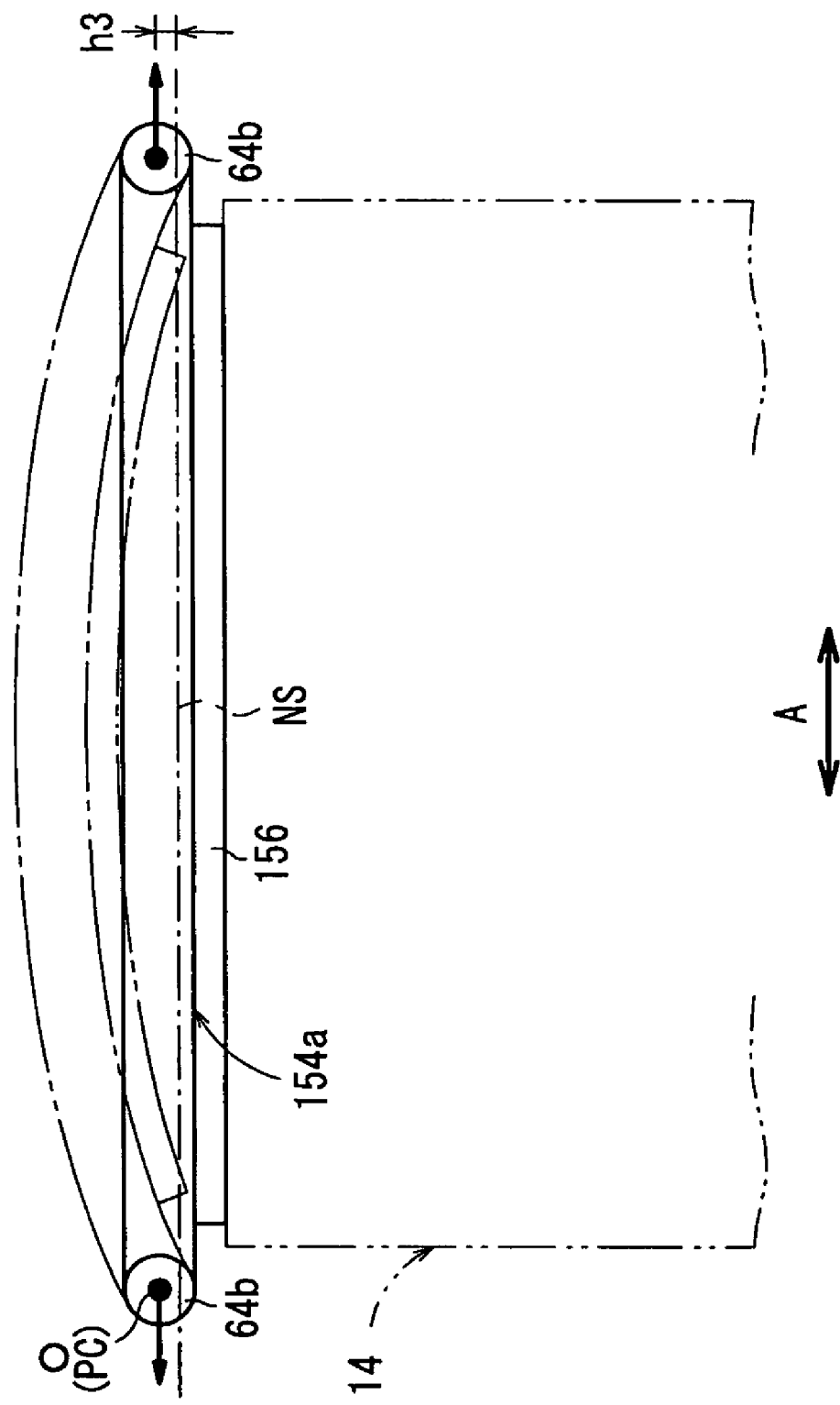
FIG. 21 is a view showing a side plate of a casing.

In the seventh embodiment, as shown in FIG. 21, when a load in the direction indicated by the arrow A is applied to the pair of coupling pins 64b, the side plate 154a is deformed in a direction away from the stack body 14. Thus, the side plate 154a is spaced away from the stack body 14. Accordingly, the same advantages as with the fifth embodiment can be obtained.

In the sixth and seventh embodiments, the ribs 146, 156 are formed integrally with the side plates 144b, 154a. Alternatively, instead of the side plates 144b, 154a, it is possible to use a side plate 160 according to an eighth embodiment as shown in FIG. 22 and a side plate 170 according to a ninth embodiment as shown in FIG. 23.

Figure 22:
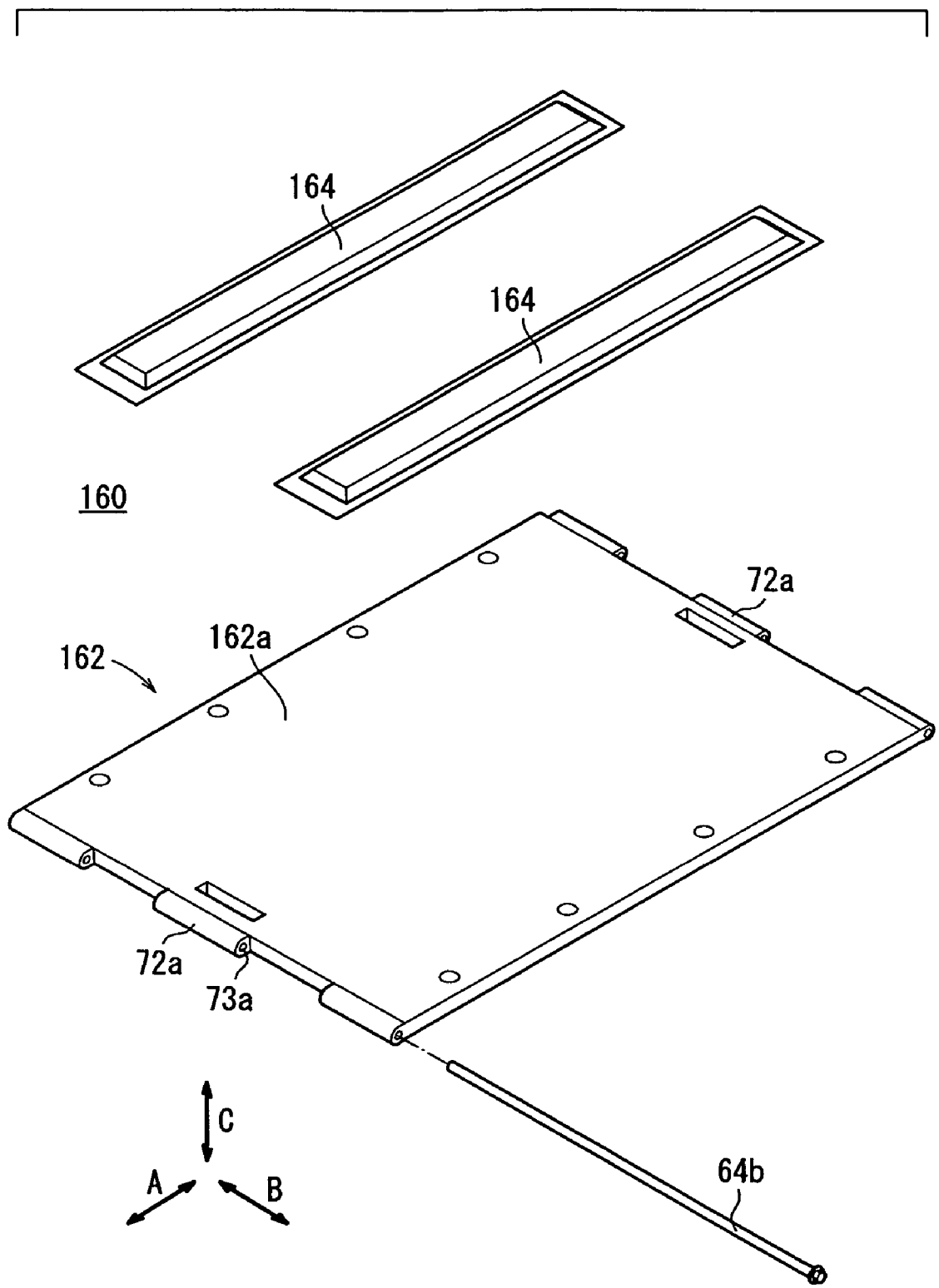
FIG. 22 is an exploded perspective view showing a side plate of a fuel cell stack according to an eighth embodiment of the present invention.

As shown in FIG. 22, in the eighth embodiment, the side plate 160 includes a substantially planar panel 162. Two rib members 164 are jointed to an outer surface 162a of the panel 162. That is, the side plate 160 includes the panel 162 and the rib members 164 jointed to the panel 162. Thus, the structure of the side plate 160 is substantially the same as the structure of the side plate 144b used in the sixth embodiment.

Figure 23:
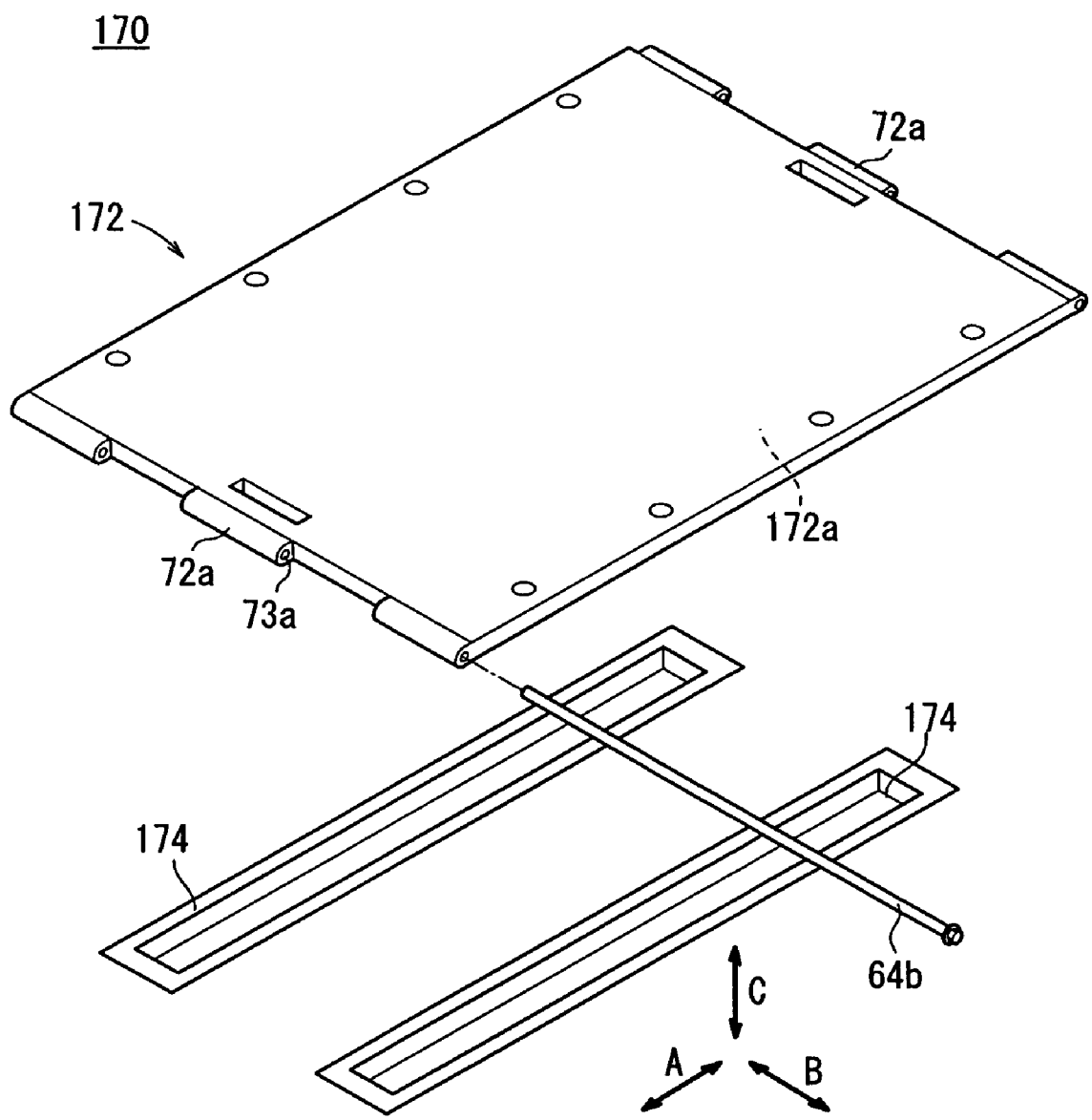
FIG. 23 is an exploded perspective view showing a side plate of a fuel cell stack according to a ninth embodiment of the present invention.

As shown in FIG. 23, in the ninth embodiment, the side plate 170 includes a substantially planar panel 172. Two rib members 174 are jointed to an inner surface of the panel 172. Thus, the structure of the side plate 170 is substantially the same as the structure of the side plate 154a used in the seventh embodiment.

Figure 24:
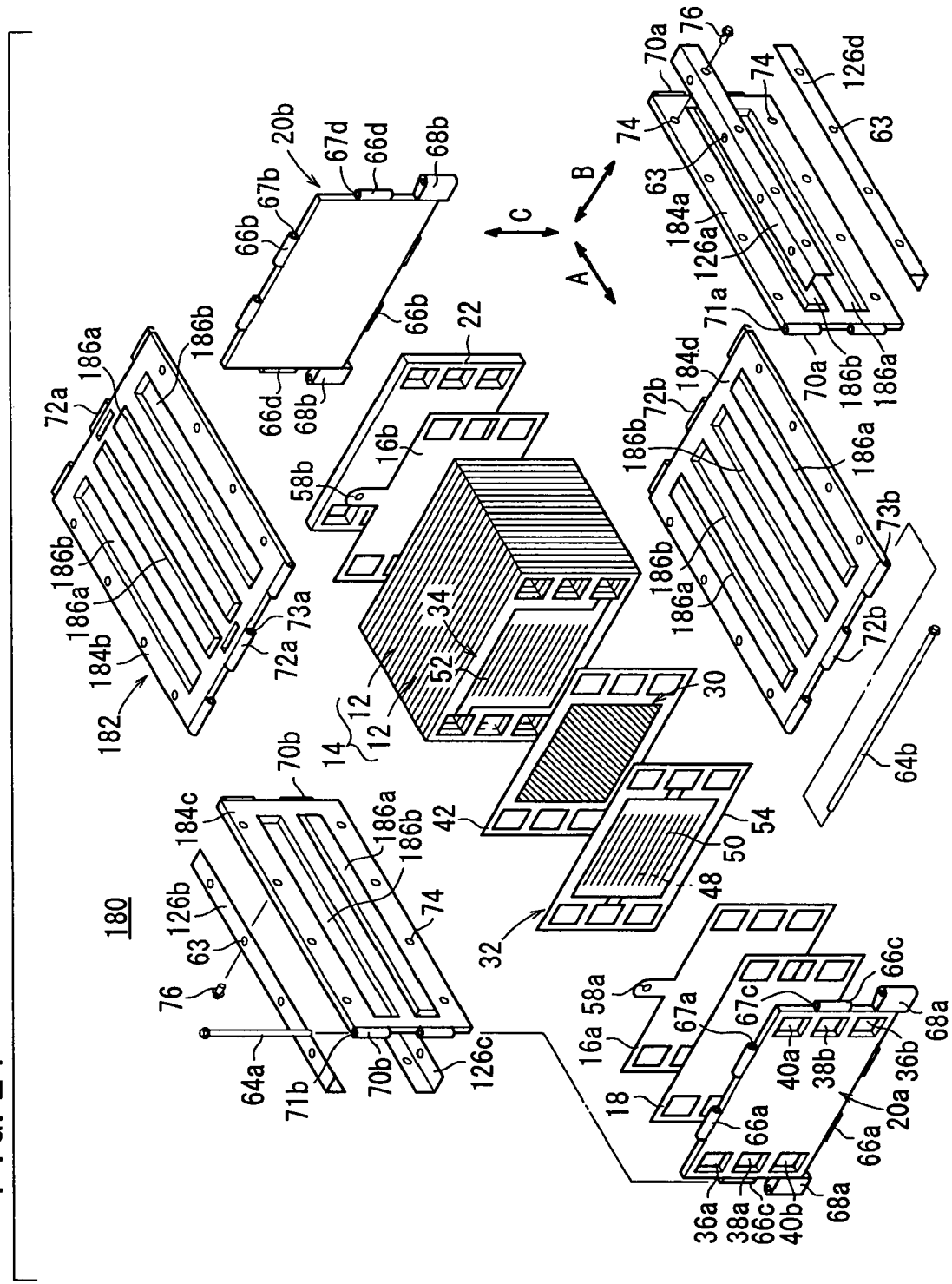
FIG. 24 is a partial exploded perspective view showing a fuel cell stack according to a tenth embodiment of the present invention.
Figure 25:
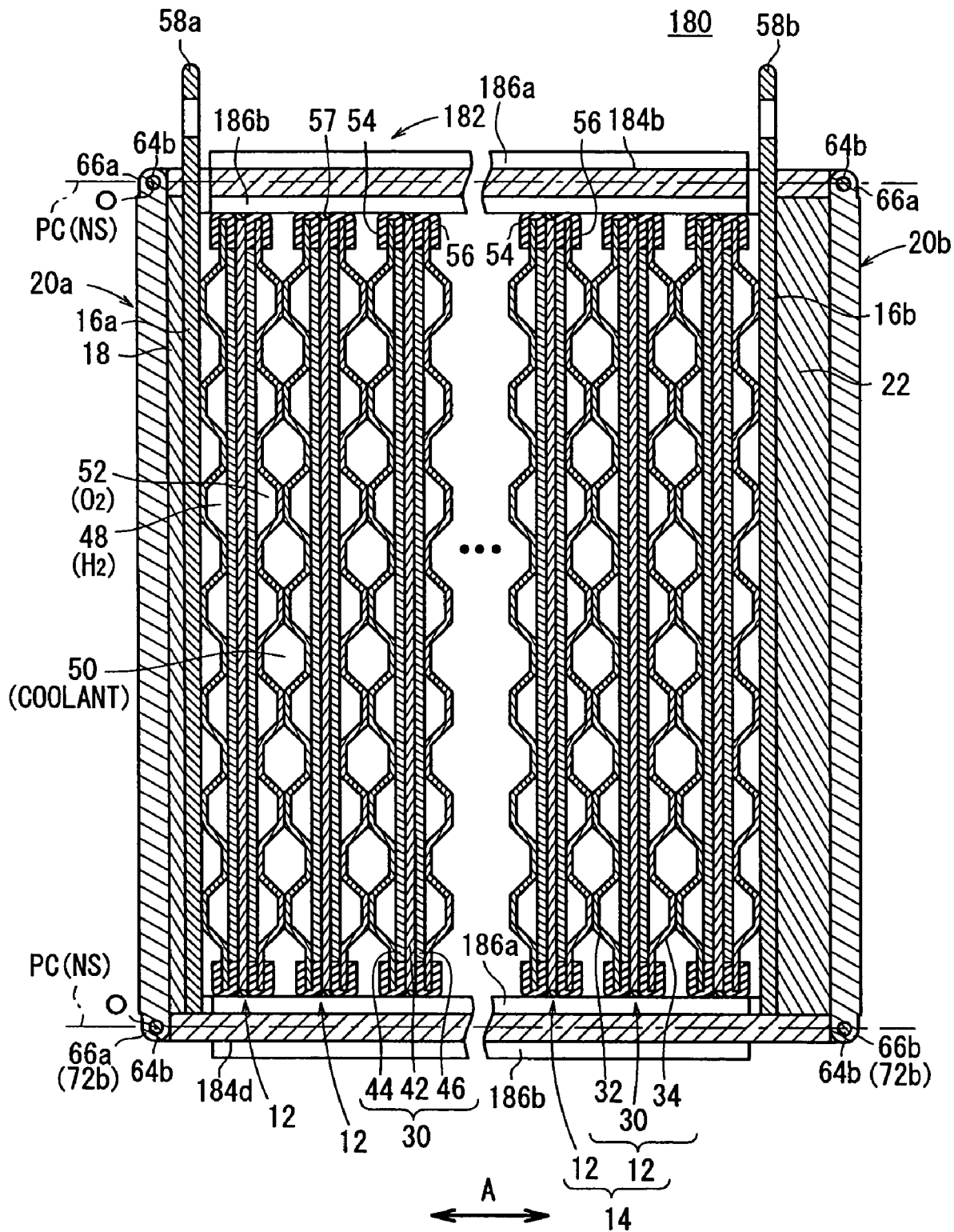
FIG. 25 is a cross sectional side view showing the fuel cell stack.

FIG. 24 is a partial exploded perspective view schematically showing a fuel cell stack 180 according to a tenth embodiment of the present invention. FIG. 25 is a cross sectional side view showing part of the fuel cell stack 180.

Figure 26:
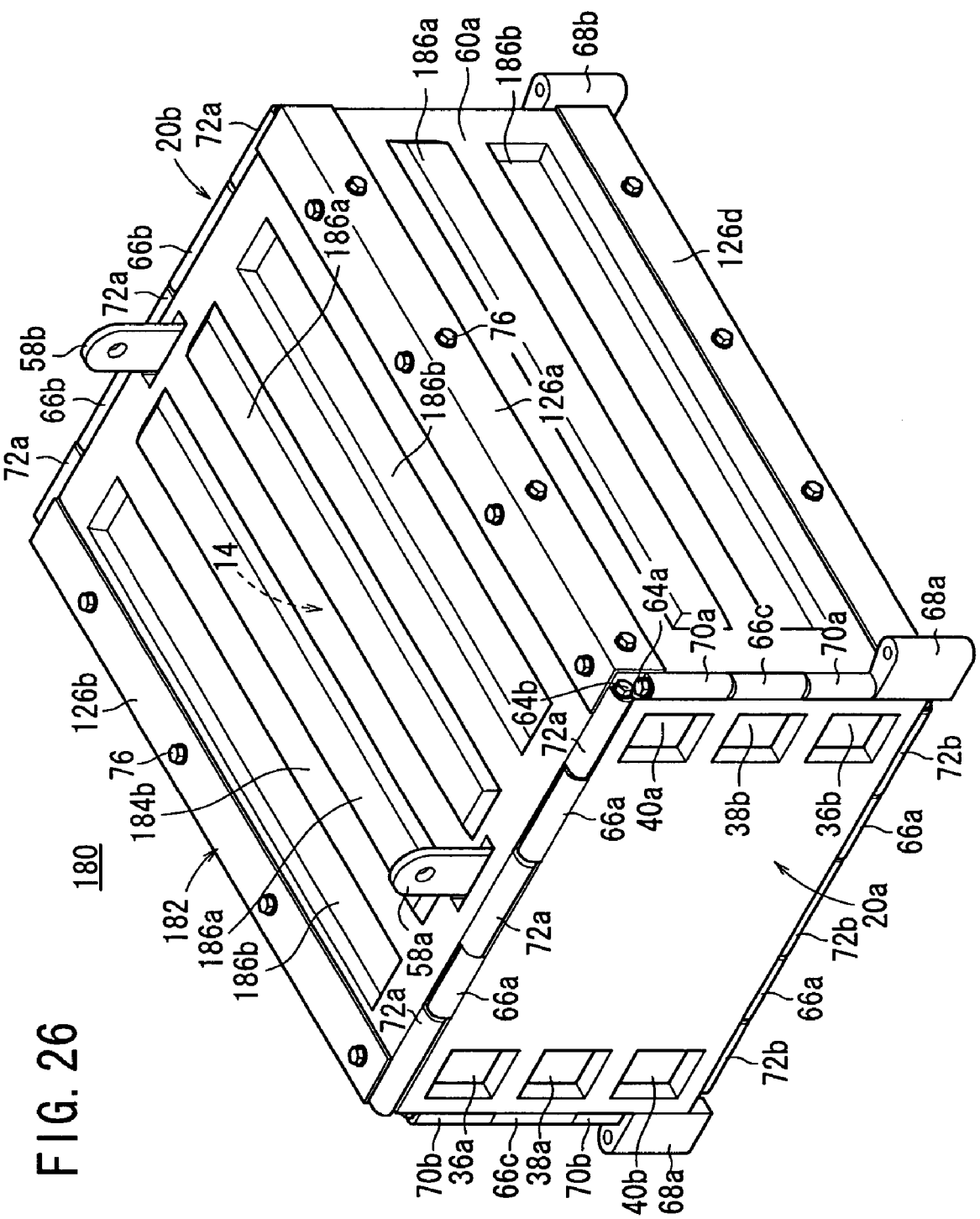
FIG. 26 is a perspective view showing the fuel cell stack.

As shown in FIGS. 24 to 26, a casing 182 of the fuel cell stack 180 includes a plurality of side plates 184a to 184d provided on sides of the stack body 14.

Figure 27:
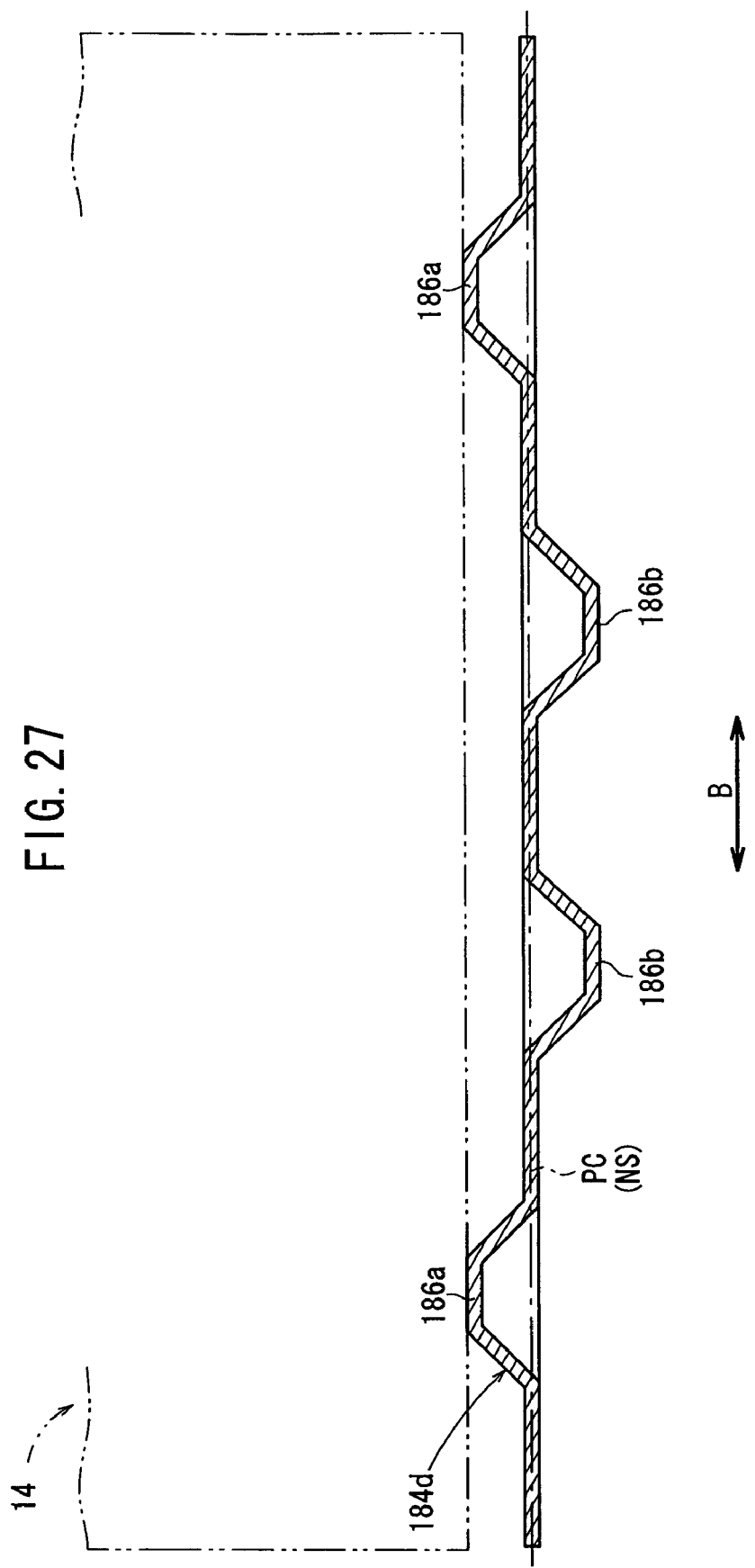
FIG. 27 is cross sectional view showing a side plate of a casing.

As shown FIGS. 24 and 27, a plurality of ribs 186a, 186b extending in the stacking direction of the stack body 14 indicated by the arrow A are formed integrally with at least the side plate 184d to form a rib-panel. The ribs 186a, 186b have the same shape. The ribs 186a protrude inwardly toward the stack body 14, and the ribs 186b protrude outwardly in a direction away from the stack body 14.

The number of the ribs 186a and the number of the ribs 186b are the same. For example, two ribs 186a and two ribs 186b are provided symmetrically with respect to the center PC of the plate thickness of the side plate 184d. Stated otherwise, the center PC of the plate thickness of the side plate 184d is on the plane of the neutral surface NS of the side plate 184d. At the second coupling portions 72b of the side plate 184d, the center of the holes 73b matches the center PC of the plate thickness of the side plate 184d. The center of the coupling pin 64b inserted into the holes 73b matches the center PC of the plate thickness, on the neutral surface NS (see FIG. 25).

The structure of the side plate 184b is the same as the structure of the side plate 184d. The constituent elements that are identical to those of the side plate 184d are labeled with the same reference numeral, and description thereof will be omitted. Each of the side plate 184a and the side plate 184c has one rib 186a and one rib 186b as necessary.

In the tenth embodiment, as shown in FIGS. 24 and 27, the side plate 184d includes the ribs 186a, 186b to form a rib-panel. Thus, the rigidity of the side plate 184d is effectively improved in comparison with the planar panel. Therefore, even if a load is applied to the casing 182 in a direction different from the stacking direction such as a twisting direction, it is possible to effectively maintain the shape of the casing 182 by the ribs 186a, 186b, and the casing 182 is not affected by vibrations outside the casing 182 or the like. Thus, it is possible to maintain the overall power generation performance and the sealing performance of the fuel cell stack 180.

Further, the side plate 184d functions to reduce the positional displacement of the stack body 14 when the stack body 14 is deformed in a direction which intersects the stacking direction. Therefore, by providing the ribs 186a, 186b for the side plate 184d to significantly improve the rigidity of the side plate 184d itself, it is possible to reduce the amount of positional displacement in the stack body 14 significantly.

Further, in the tenth embodiment, as shown in FIG. 25, the center O of the coupling pin 64b at the second coupling portion 72b of the side plate 184d is positioned on the neutral surface NS of the side plate 184d. Therefore, when a load in the stacking direction of the stack body 14 is applied to the opposite ends of the side plate 184d in the direction indicated by the arrow A through the coupling pins 64b, no force in a bending direction is applied to the side plate 184d.

Further, in the tenth embodiment, the center O of the coupling pin 64b matches the center PC of the plate thickness of the side plat 184d, on the neutral surface NS. With the simple and compact structure, it is possible to prevent the force in a bending direction from being applied to the side plate 184d. Accordingly, the rigidity of the casing 182 is maintained suitably. The positional displacement in the stack body 14 is inhibited, and it is possible to reliably apply the desired tightening load to the stack body 14 in the stacking direction.

Figure 28:
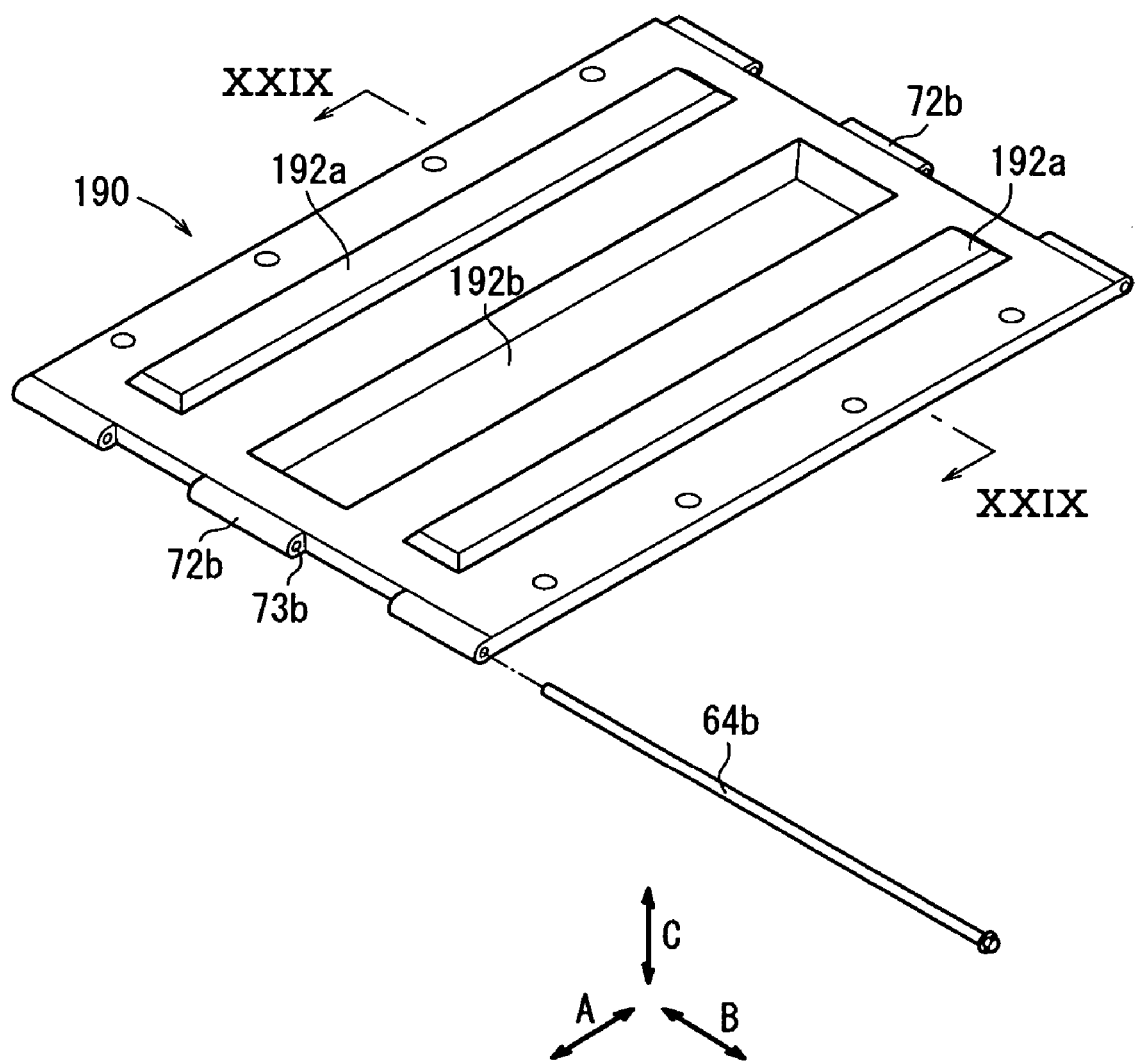
FIG. 28 is a perspective view showing a side plate of a fuel cell stack according to an eleventh embodiment of the present invention.

FIG. 28 is a perspective view showing a side plate 190 of a fuel cell stack according to an eleventh embodiment of the present invention.

The side plate 190 corresponds to the side plate 184d used in the tenth embodiment.

The side plate 190 includes two ribs 192a and one rib 192b positioned between the ribs 192a. The ribs 192a and the rib 192b are formed integrally with the side plate 190, and extend in the direction indicated by the arrow A.

Figure 29:
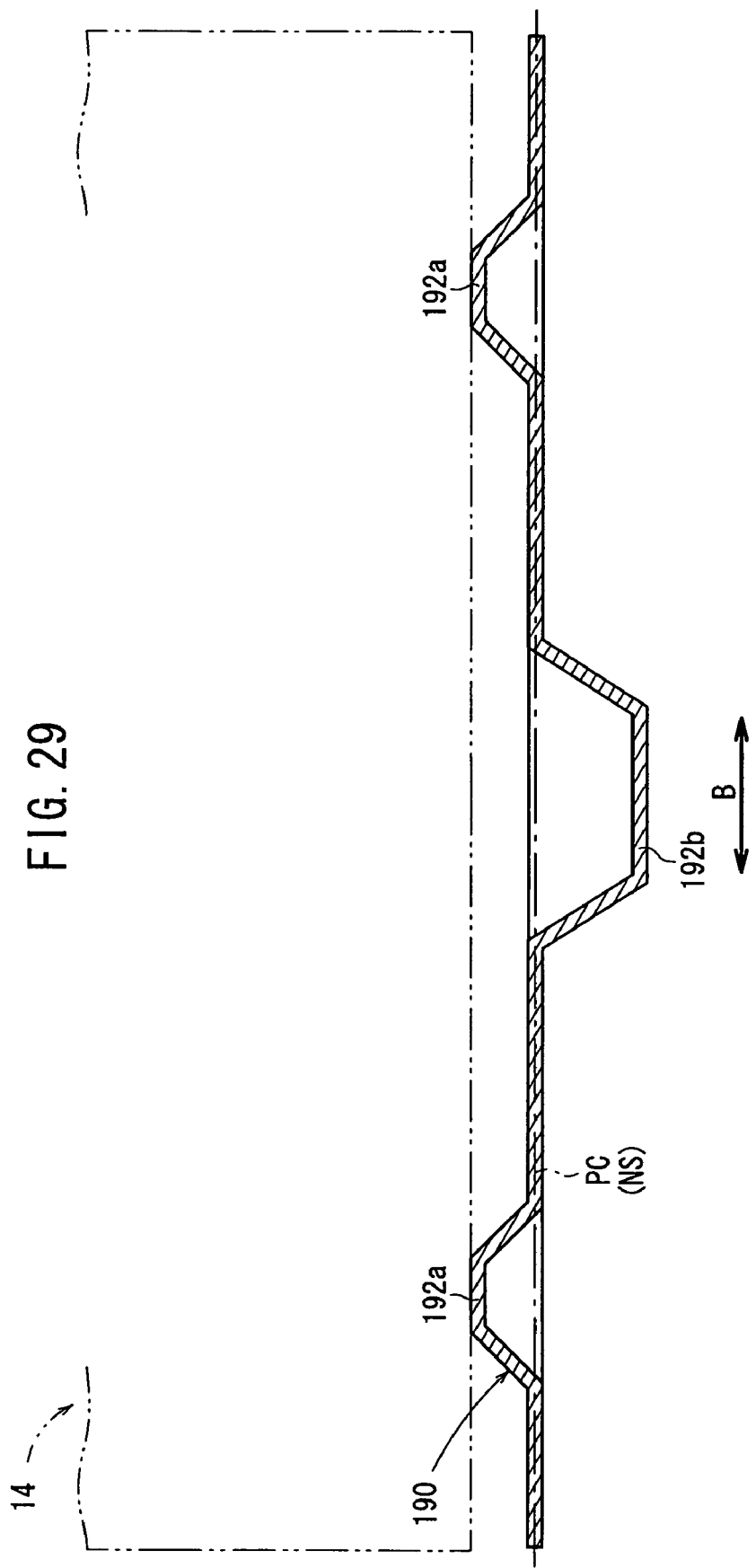
FIG. 29 is a cross sectional view showing the side plate, taken along a line XXIX-XXIX in FIG. 28.

As shown in FIG. 29, the two ribs 192a protrude toward the stack body 14, and the single rib 192b protrudes away from the stack body 14. The protrusion distance of the two ribs 192a is the same as the protrusion distance of the rib 192b. Thus, the center PC of the plate thickness of the side plate 190 is on the plane of the neutral surface NS of the side plate 190. The center of the coupling pin 64b inserted into the second coupling portions 72b matches the center PC of the plate thickness of the side plate 190, on the neutral surface NS.

While the eleventh embodiment has been described in connection with only the side plate 190 corresponding to the side plate 184d used in the tenth embodiment, it should be understood that the structures of unillustrated side plates corresponding to the side plates 184a to 184c are the same as the structure of the side plate 190. Further, in twelfth and thirteenth embodiments as described later, the structures of side plates are the same as the structure of the side plate 190.

In the eleventh embodiment, the side plate 190 includes the ribs 192a, 192b to form a rib-panel. Therefore, the rigidity of the side plate 190 is improved effectively in comparison with the planar panel. Further, the center of the coupling pin 64b is positioned on the neutral surface NS of the side plate 190. Therefore, the same advantages as with the tenth embodiment can be obtained. For example, when a load in the stacking direction is applied between the coupling pins 64b, no force in the bending direction is applied to the side plate 190.

Figure 30:
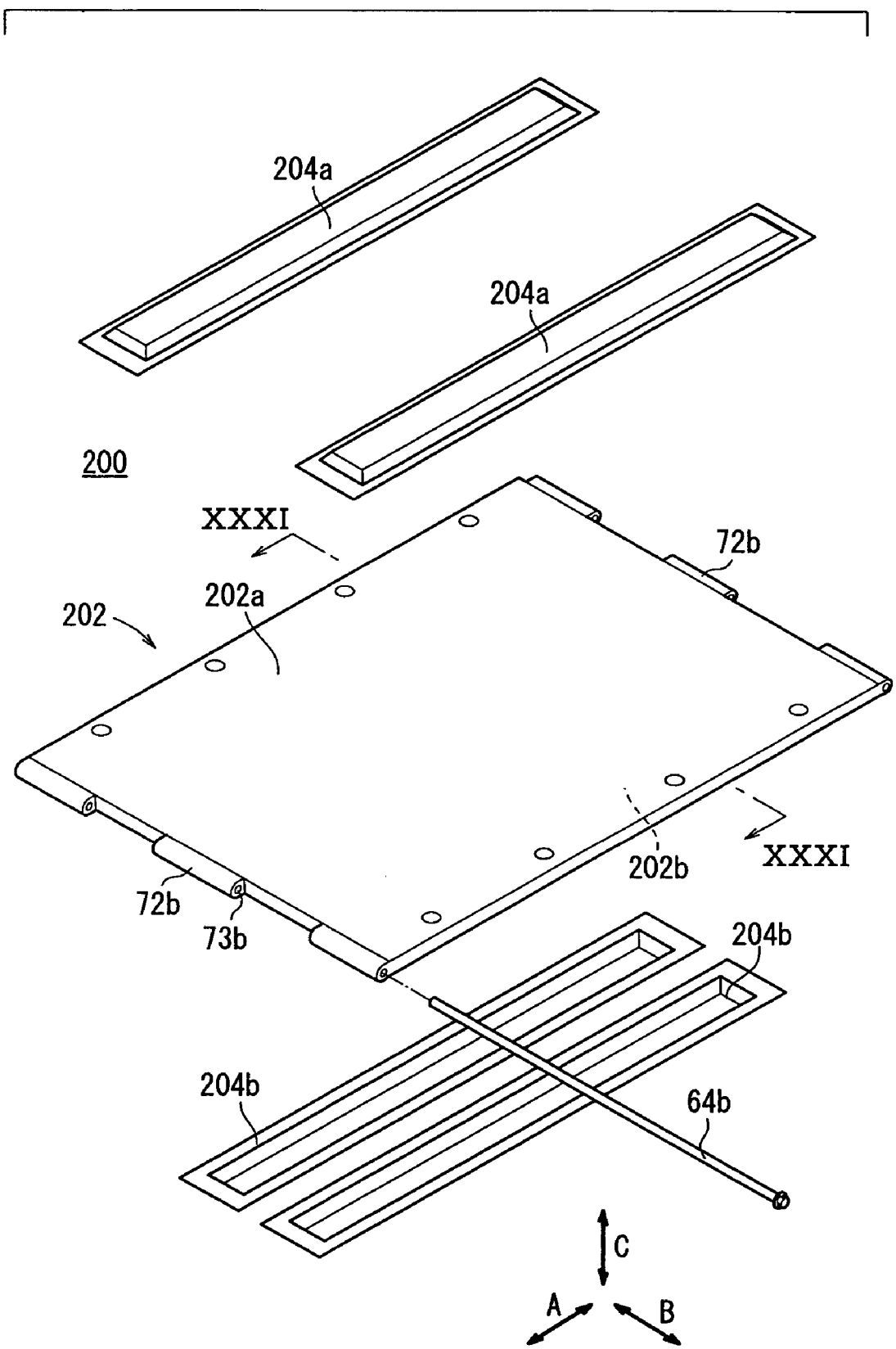
FIG. 30 is an exploded perspective view showing a side plate of a fuel cell stack according to a twelfth embodiment of the present invention.
Figure 31:
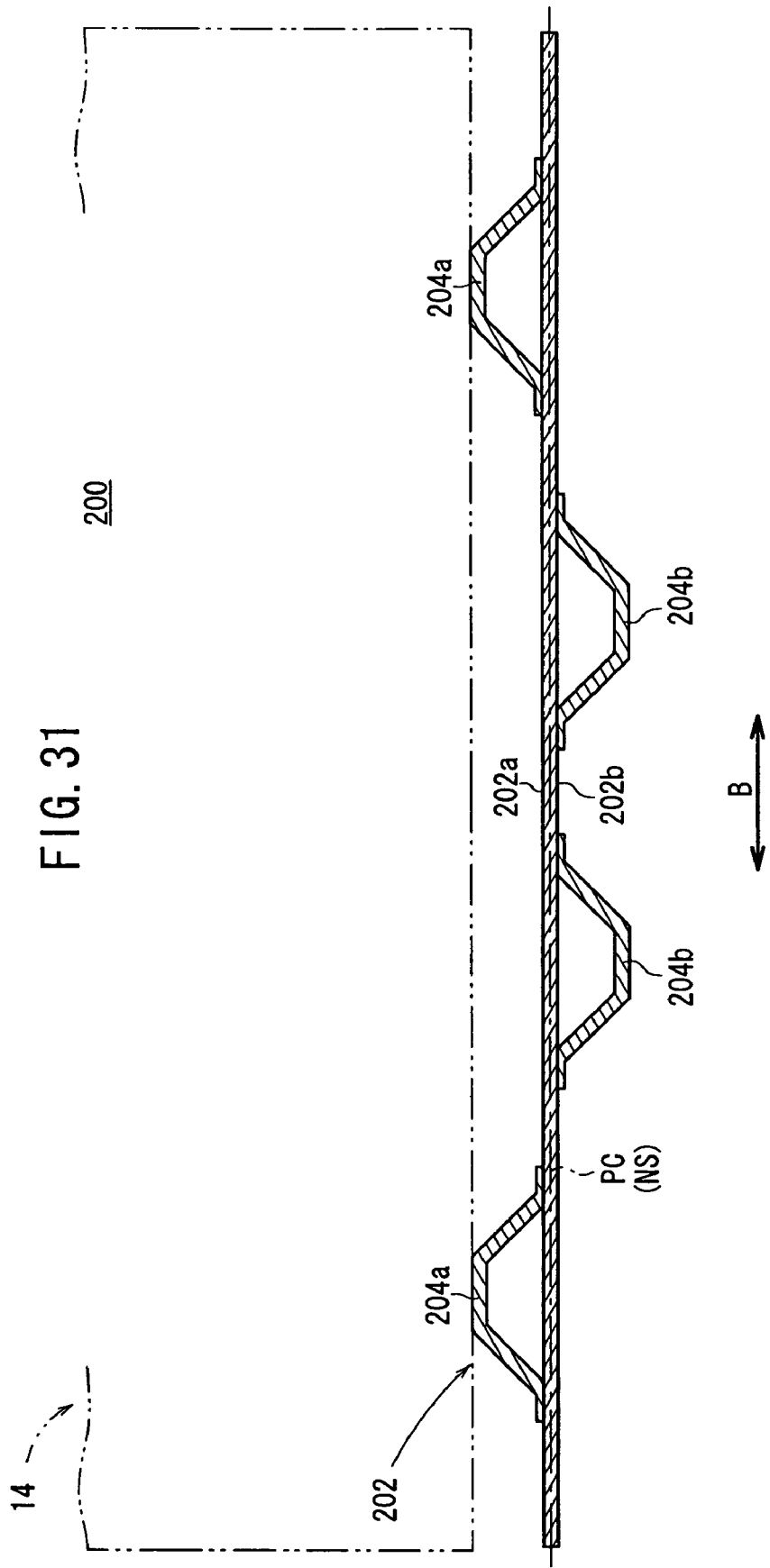
FIG. 31 is a cross sectional view showing a state in which members of the side plate are connected, taken along a line XXXI-XXXI in FIG. 30.

FIG. 30 is an exploded perspective view showing a side plate 200 of a fuel cell stack according to a twelfth embodiment of the present invention. FIG. 31 is a cross sectional view showing a state in which members of the side plate 200 is assembled, taken along a line XXXI-XXXI in FIG. 30.

The side plate 200 corresponds to the side plate 184d used in the tenth embodiment. The side plate 200 includes a substantially planar panel 202. Two rib members 204a are jointed to one surface 202a of the panel 202. Further, two rib members 204b are jointed to the other surface 202b of the panel 202, at positions between the rib members 204a.

The rib members 204a and the rib members 204b have the same shape. The rib members 204a are provided on the side of the stack body 14, and the rib members 204b are provided on the side opposite to the stack body 14 (see FIG. 31). The rib members 204a are symmetrical with the rib members 204b with respect to the center PC of the plate thickness of the panel 202. That is, the center PC of the plate thickness of the side plate 200 is positioned on the plane of the neutral surface NS of the side plate 200.

Therefore, the structure of the side plate 200 in the twelfth embodiment is the substantially same as the structure of the side plate 184d used in the tenth embodiment. Thus, the same advantages as with the tenth embodiment can be obtained.

Figure 32:
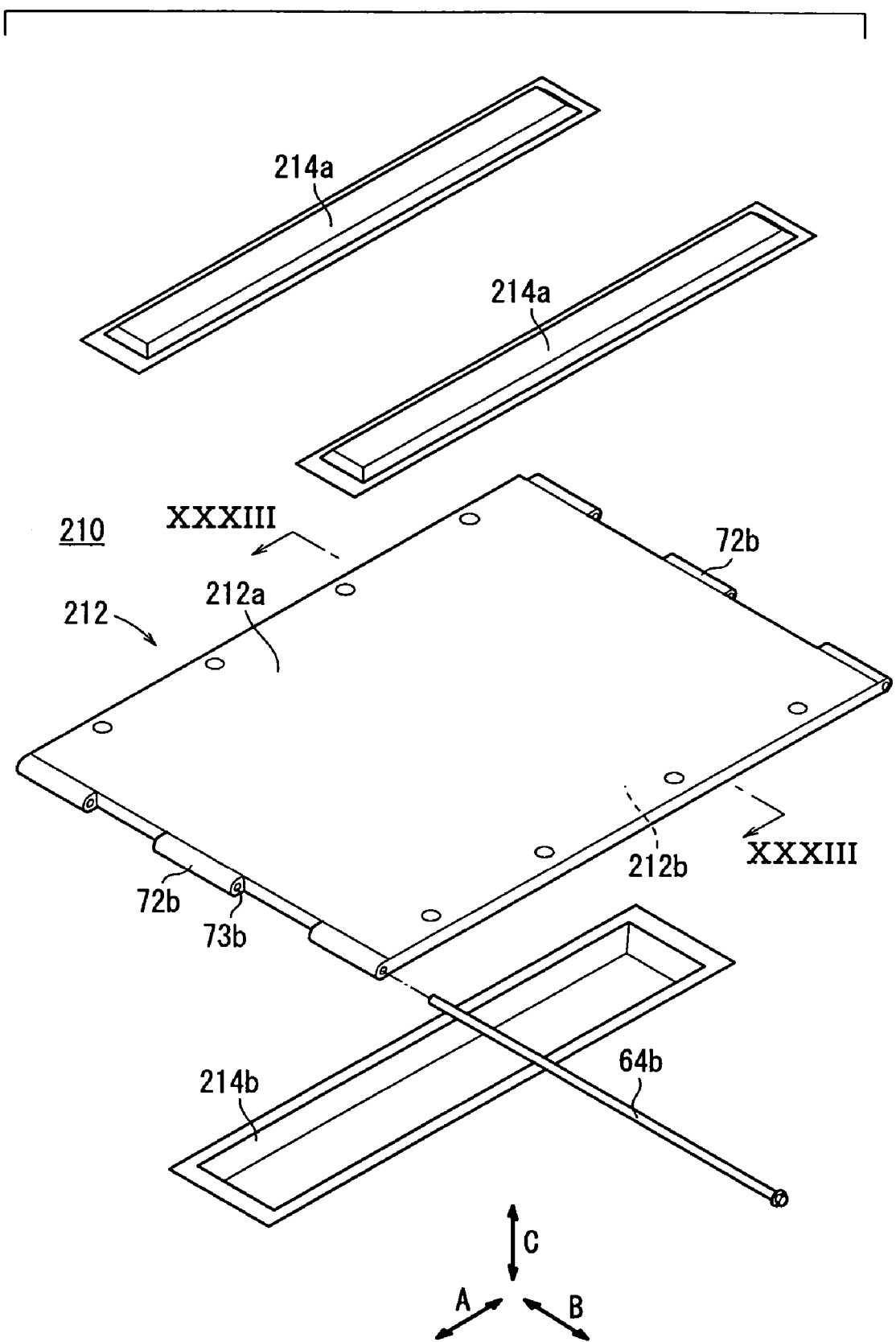
FIG. 32 is an exploded perspective view showing a side plate of a fuel cell stack according to a thirteenth embodiment of the present invention.
Figure 33:
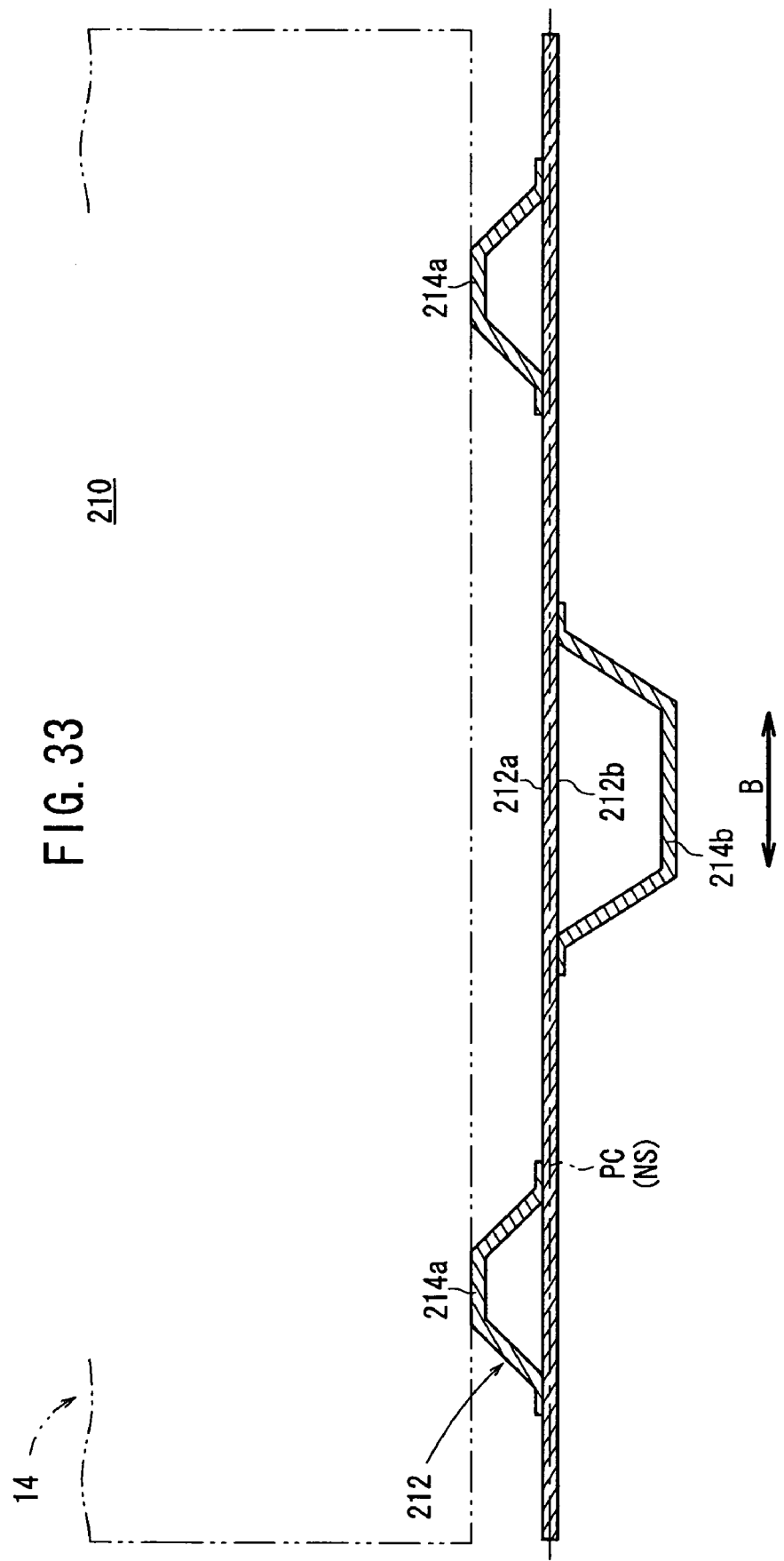
FIG. 33 is a cross sectional view showing a state in which members of the side plate are connected, taken along a line XXXIII-XXXIII in FIG. 32.
Figure 34:
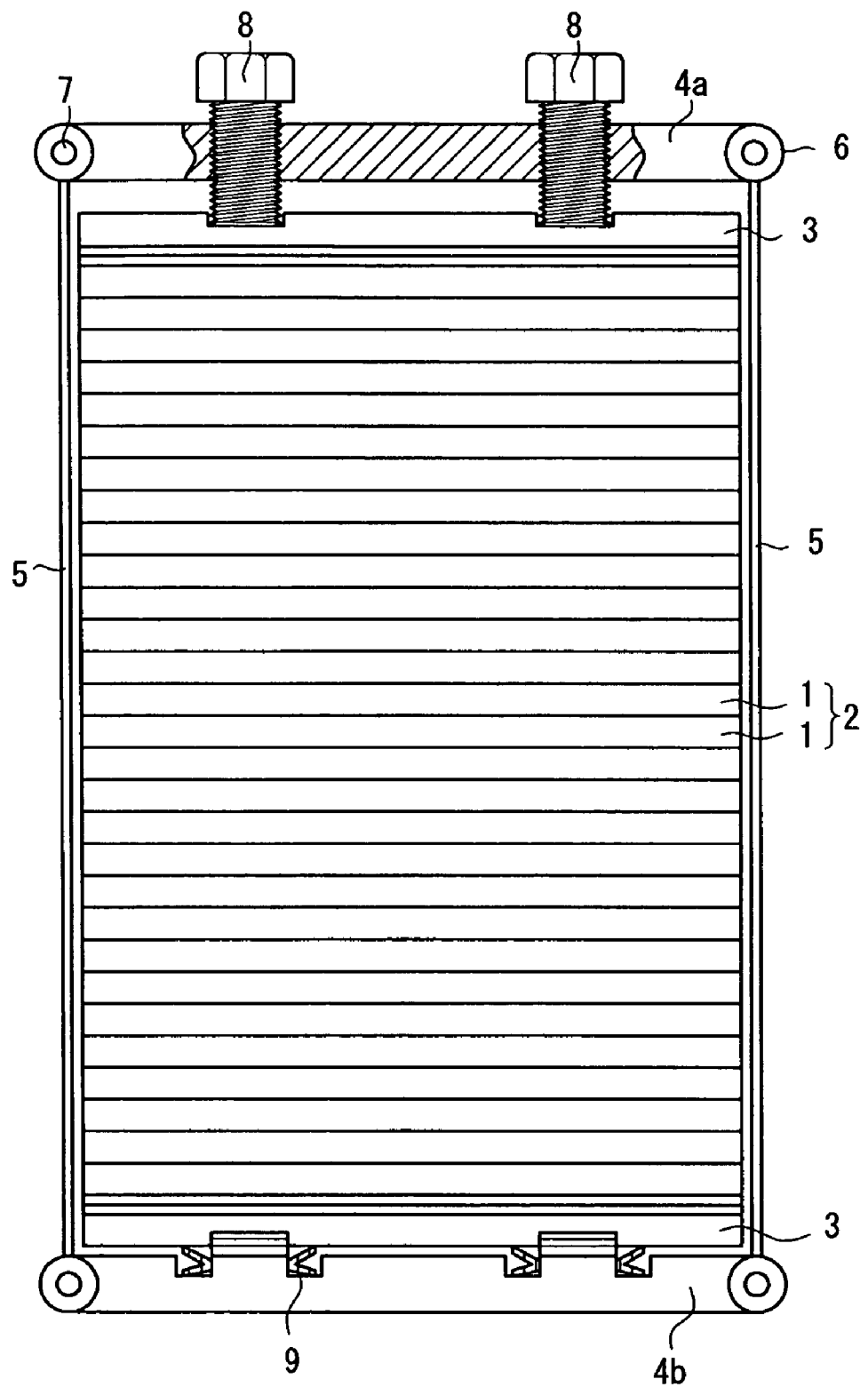
FIG. 34 is a view showing a fuel cell stack disclosed in Japanese Laid-Open Patent Publication No. 2001-135344.

FIG. 32 is an exploded perspective view showing a side plate 210 of a fuel cell stack according to a thirteenth embodiment of the present invention. FIG. 33 is a cross sectional view showing a state in which members of the side plate 210 is assembled, taken along a line XXXIII-XXXIII in FIG. 32.

The side plate 210 corresponds to the side plate 190 used in the eleventh embodiment, and includes a substantially planar panel 212. Two rib members 214a are jointed to a surface 212a of the panel 212 on the side of the stack body 14 and a single rib member 214b is jointed to the opposite surface 212b of the panel 212.

As shown in FIG. 33, the rib member 214b is larger than the rib member 214a. The center PC of the plate thickness of the side plate 210 is positioned on the plane of the neutral surface NS of the side plate 210. Thus, in the thirteenth embodiment, the same advantages as with the eleventh embodiment can be obtained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising:
a box-shaped casing; and
a stack body provided in said casing, said stack body being formed by stacking a plurality of unit cells in a stacking direction, said unit cells each including an electrolyte electrode assembly and separators sandwiching said electrolyte electrode assembly, said electrolyte electrode assembly including a pair of electrodes, and an electrolyte interposed between said electrodes, wherein said casing comprises:
end plates provided at opposite ends of said stack body in the stacking direction;
a plurality of side plates provided on sides of said stack body; and
coupling pins each for coupling said end plate and said side plate, and wherein
said side plates include a first side plate and a second side plate provided adjacent to each other;
said first side plate has a side surface disposed in the stacking direction that includes a neutral surface, at least one coupling pin being located on said side surface, and includes a flange for attaching said first side plate to said second side plate; and
said first side plate is curved in a direction in which the center of said at least one coupling pin for coupling said first side plate to said end plate is set apart from said neutral surface of said first side plate by a predetermined distance so that said first side plate is curved along a length extending from one end of the side plate to an opposed end of the side plate so that the side plate has a substantially arcuate shape therebetween when a load is applied to the fuel cell stack in the stacking direction.

2. A fuel cell stack according to claim 1, wherein the width of said first side plate is smaller than the width of said second side plate.

3. A fuel cell stack according to claim 1, wherein the center of said at least one coupling pin is offset from the neutral surface of said first side plate in a direction away from said stack body.

4. A fuel cell stack according to claim 1, wherein said flange is provided at least at one end of said first side plate in a lateral direction, and curved toward said stack body.

5. A fuel cell stack according to claim 1, wherein the width of said first side plate is larger than the width of said second side plate.

6. A fuel cell stack according to claim 5, wherein said flange is provided at least at one end of said first side plate in a lateral direction, and curved toward said stack body.

7. A fuel cell stack comprising:

a box-shaped casing; and a stack body provided in said casing, said stack body being formed by stacking a plurality of unit cells in a stacking direction, said unit cells each including an electrolyte electrode assembly and separators sandwiching said electrolyte electrode assembly, said electrolyte electrode assembly including a pair of electrodes, and an electrolyte interposed between said electrodes, wherein said casing comprises:

end plates provided at opposite ends of said stack body in the stacking direction;

a plurality of side plates provided on sides of said stack body; and coupling pins each for coupling said end plate and said side plate, and wherein in at least one of said side plates having a side surface disposed in the stacking direction and having a neutral surface on said side surface, at least one coupling pin being located on said side surface, the center of said at least one coupling pin is set apart from said neutral surface of said side plate by a predetermined distance so that said side plate is curved along a length extending from one end of the side plate to an opposed end of the side plate so that said side plate has a substantially arcuate shape therebetween, being curved in a direction perpendicular to the stacking direction when a load is applied to the fuel cell stack in the stacking direction.

8. A fuel cell stack according to claim 7, wherein the center of said at least one coupling pin is offset from the neutral surface of said side plate toward said stack body.

9. A fuel cell stack according to claim 7, wherein the center of said at least one coupling pin is offset from the neutral surface of said side plate in a direction away from said stack body.

10. A fuel cell stack according to claim 7, wherein the neutral surface of said side plate matches the center of the plate thickness of said side plate.

11. A fuel cell stack according to claim 7, wherein at least one of said side plates is a rib-panel including a panel and a rib which is formed integrally with or separately from said panel.

12. A fuel cell stack according to claim 11, wherein the center of said at least one coupling pin matches the center of the plate thickness of said side plate.

13. A fuel cell stack according to claim 7, wherein at least a part of the side plate contacts the stack body.

14. A fuel cell stack according to claim 7, wherein said side plate is curved in a direction in which the center of said at least one coupling pin is set apart from said neutral surface of said side plate.

15. A fuel cell stack according to claim 7, wherein said at least one coupling pin is a pair of coupling pins, and a center of each of said pair of coupling pins is offset from the neutral surface of said side plate toward said stack body.

16. A fuel cell stack according to claim 7, wherein said at least one coupling pin is a pair of coupling pins, and a center of each of said pair of coupling pins is offset from the neutral surface of said side plate in a direction away from said stack body.

* * * * *

UNITED STATES PATENT AND TRADEMARK OFFICE
CERTIFICATE OF CORRECTION

PATENT NO. : 7,641,999 B2  Page 1 of 1
APPLICATION NO. : 11/212285
DATED : January 5, 2010
INVENTOR(S) : Ishizuka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 562 days.

Signed and Sealed this

Twenty-first Day of December, 2010

David J. Kappos
*Director of the United States Patent and Trademark Office*